(12) United States Patent
Grüner et al.

(10) Patent No.: US 10,759,941 B2
(45) Date of Patent: Sep. 1, 2020

(54) METAL EFFECT PIGMENTS WITH HIGH CHROMA AND HIGH BRILLIANCY, METHOD FOR THE PRODUCTION AND USE THEREOF

(71) Applicant: Eckart GmbH, Hartenstein (DE)

(72) Inventors: Michael Grüner, Auerbach (DE); Günter Kaupp, Neuhaus (DE); Ralph Schneider, Lauf (DE)

(73) Assignee: Eckart GmbH (DE)

( * ) Notice: Subject to any disclaimer, the term of this patent is extended or adjusted under 35 U.S.C. 154(b) by 59 days.

(21) Appl. No.: 15/536,945

(22) PCT Filed: Dec. 21, 2015

(86) PCT No.: PCT/EP2015/080864
§ 371 (c)(1),
(2) Date: Jun. 16, 2017

(87) PCT Pub. No.: WO2016/097419
PCT Pub. Date: Jun. 23, 2016

(65) Prior Publication Data
US 2018/0155550 A1 Jun. 7, 2018

(30) Foreign Application Priority Data

Dec. 19, 2014 (EP) .................................... 14199139

(51) Int. Cl.
*C09C 1/00* (2006.01)
*C09C 1/64* (2006.01)
*C09C 1/62* (2006.01)

(52) U.S. Cl.
CPC .............. *C09C 1/0015* (2013.01); *C09C 1/62* (2013.01); *C09C 1/642* (2013.01);
(Continued)

(58) Field of Classification Search
CPC ......... C09C 1/0015; C09C 1/62; C09C 1/642; C09C 2200/1054; C09C 2200/20;
(Continued)

(56) References Cited

U.S. PATENT DOCUMENTS

| 3,711,308 A | 1/1973 | Brand et al. |
| 4,086,100 A | 4/1978 | Esselborn et al. |

(Continued)

FOREIGN PATENT DOCUMENTS

| CA | 2180669 A1 | 1/1997 |
| CN | 1312840 A | 9/2001 |

(Continued)

OTHER PUBLICATIONS

U.S. Appl. No. 62/004,007, filed May 28, 2014.
BYK-Gardner; Katalog; "Qualitatskontrolle tor Lacke and Kunststoffe" 2011/2012, pp. 97-98. In English and German.

*Primary Examiner* — Pegah Parvini
(74) *Attorney, Agent, or Firm* — The Webb Law Firm

(57) ABSTRACT

The invention relates to a metal effect pigment including a metallic substrate in platelet form and a coating applied thereto, wherein the coating includes a spacer layer. The invention further relates to a process for production of and to the use of the metal effect pigment.

14 Claims, 2 Drawing Sheets

(52) U.S. Cl.
CPC ...... *C01P 2004/54* (2013.01); *C01P 2006/62* (2013.01); *C01P 2006/63* (2013.01); *C01P 2006/64* (2013.01); *C09C 2200/1054* (2013.01); *C09C 2200/1058* (2013.01); *C09C 2200/20* (2013.01); *C09C 2200/301* (2013.01); *C09C 2200/302* (2013.01); *C09C 2220/106* (2013.01)

(58) Field of Classification Search
CPC ........ C09C 2200/301; C09C 2200/302; C09C 2220/106; C01P 2004/54; C01P 2006/62; C01P 2006/63
See application file for complete search history.

(56) References Cited

U.S. PATENT DOCUMENTS

| | | | |
|---|---|---|---|
| 4,744,832 A | 5/1988 | Franz et al. | |
| 5,017,207 A | 5/1991 | Walkinson et al. | |
| 5,273,576 A | 12/1993 | Sullivan et al. | |
| 5,302,199 A | 4/1994 | Prengel et al. | |
| 5,607,504 A | 3/1997 | Schmid et al. | |
| 5,624,486 A | 4/1997 | Schmid et al. | |
| 5,753,317 A | 5/1998 | Sullivan et al. | |
| 5,958,125 A | 9/1999 | Schmid et al. | |
| 6,045,914 A | 4/2000 | Sullivan et al. | |
| 6,113,873 A | 9/2000 | Tunashima et al. | |
| 6,261,469 B1 | 7/2001 | Zakhidov et al. | |
| 6,280,520 B1 | 8/2001 | Andes et al. | |
| 6,517,763 B1 | 2/2003 | Zakhidov et al. | |
| 6,569,529 B1* | 5/2003 | Phillips | C09C 1/0015 106/403 |
| 6,579,355 B1 | 6/2003 | Schmidt et al. | |
| 6,596,070 B1 | 7/2003 | Schmidt et al. | |
| 6,599,355 B1 | 7/2003 | Schmidt et al. | |
| 6,656,259 B2 | 12/2003 | Pfaff et al. | |
| 6,692,561 B1* | 2/2004 | Schoen | C09D 5/36 106/417 |
| 6,719,838 B2 | 4/2004 | Heider et al. | |
| 6,840,993 B2 | 1/2005 | Schmidt et al. | |
| 7,169,222 B2 | 1/2007 | Bruckner et al. | |
| 7,241,503 B2 | 7/2007 | Noguchi | |
| 7,303,622 B2 | 12/2007 | Loch et al. | |
| 7,413,599 B2 | 8/2008 | Henglein et al. | |
| 7,604,862 B2 | 10/2009 | Ambrosius et al. | |
| 7,993,443 B2 | 8/2011 | Fuller et al. | |
| 7,993,444 B2 | 8/2011 | Fuller et al. | |
| 8,007,583 B2 | 8/2011 | Fuller et al. | |
| 8,383,531 B2 | 2/2013 | Fujiwara et al. | |
| 8,383,532 B2 | 2/2013 | Fujiwara et al. | |
| 8,500,901 B2 | 8/2013 | Rueger et al. | |
| 8,585,818 B1 | 11/2013 | Jones | |
| 8,715,407 B2 | 5/2014 | Schumacher et al. | |
| 8,728,226 B2 | 5/2014 | Schumacher et al. | |
| 8,728,227 B2 | 5/2014 | Schumacher et al. | |
| 8,728,228 B2 | 5/2014 | Schumacher et al. | |
| 9,051,471 B2 | 6/2015 | Gruner et al. | |
| 9,663,661 B2 | 5/2017 | Kaupp et al. | |
| 2002/0104461 A1 | 8/2002 | Schmidt et al. | |
| 2002/0169244 A1 | 11/2002 | Ostertag et al. | |
| 2003/0005859 A1 | 1/2003 | Andes et al. | |
| 2003/0039836 A1 | 2/2003 | Pfaff et al. | |
| 2003/0097965 A1 | 5/2003 | Heider et al. | |
| 2003/0205170 A1 | 11/2003 | Schmidt et al. | |
| 2003/0209169 A1 | 11/2003 | Andes et al. | |
| 2004/0003758 A1 | 1/2004 | Bruckner et al. | |
| 2004/0052743 A1 | 3/2004 | Schmidt et al. | |
| 2004/0139889 A1 | 7/2004 | Zimmermann et al. | |
| 2004/0144023 A1 | 7/2004 | Bruckner et al. | |
| 2004/0166316 A1 | 8/2004 | Noguchi | |
| 2004/0180010 A1 | 9/2004 | Andes et al. | |
| 2006/0027140 A1 | 2/2006 | Kniess et al. | |
| 2006/0042509 A1 | 3/2006 | Henglein et al. | |
| 2006/0047018 A1 | 3/2006 | Li et al. | |
| 2006/0225609 A1 | 10/2006 | Rueger et al. | |
| 2006/0254315 A1 | 11/2006 | Winkler et al. | |
| 2007/0104663 A1 | 5/2007 | Henglein et al. | |
| 2007/0199478 A1 | 8/2007 | Schlegl et al. | |
| 2007/0243149 A1 | 10/2007 | Hofacker et al. | |
| 2008/0181921 A1* | 7/2008 | DeLuca | C09C 1/0024 424/401 |
| 2008/0274198 A1 | 11/2008 | Schweinfurth | |
| 2009/0264575 A1 | 10/2009 | Henglein et al. | |
| 2010/0047199 A1 | 2/2010 | Trummer et al. | |
| 2010/0095868 A1 | 4/2010 | Kaupp et al. | |
| 2010/0116169 A1 | 5/2010 | Kaupp et al. | |
| 2010/0175587 A1 | 7/2010 | Rueger et al. | |
| 2010/0297045 A1 | 11/2010 | Kaupp et al. | |
| 2010/0322981 A1 | 12/2010 | Bujard et al. | |
| 2011/0048276 A1 | 3/2011 | Schlegl et al. | |
| 2011/0160389 A1 | 6/2011 | Bubat et al. | |
| 2011/0226161 A1 | 9/2011 | Schumacher et al. | |
| 2011/0251293 A1 | 10/2011 | Trummer et al. | |
| 2011/0259243 A1 | 10/2011 | Schumacher et al. | |
| 2011/0265689 A1 | 11/2011 | Schumacher et al. | |
| 2011/0265690 A1 | 11/2011 | Schumacher et al. | |
| 2013/0149363 A1 | 6/2013 | Schmidt et al. | |
| 2013/0164356 A1 | 6/2013 | Pfaff et al. | |
| 2013/0216597 A1 | 8/2013 | Mathias et al. | |
| 2014/0018439 A1 | 1/2014 | Gruner et al. | |
| 2014/0165878 A1 | 6/2014 | Chang et al. | |
| 2014/0251184 A1 | 9/2014 | McGuire et al. | |
| 2015/0259536 A1 | 9/2015 | Gruner et al. | |
| 2015/0344677 A1 | 12/2015 | Jones et al. | |
| 2016/0185972 A1 | 6/2016 | Schmidt | |

FOREIGN PATENT DOCUMENTS

| | | |
|---|---|---|
| CN | 1519278 | 8/2004 |
| CN | 101289580 A | 10/2008 |
| CN | 102718229 A | 10/2012 |
| CN | 103183972 A | 7/2013 |
| CN | 104870571 A | 8/2015 |
| CN | 106536640 A | 3/2017 |
| DE | 1959998 A1 | 7/1971 |
| DE | 19836810 A1 | 2/2000 |
| DE | 102010021530 A1 | 12/2011 |
| DE | 102011012214 A1 | 8/2012 |
| EP | 0289240 B1 | 11/1988 |
| EP | 0668329 A2 | 8/1995 |
| EP | 0708154 A2 | 4/1996 |
| EP | 0723997 A1 | 7/1996 |
| EP | 0753545 A2 | 1/1997 |
| EP | 0870730 A1 | 10/1998 |
| EP | 0950693 A1 | 10/1999 |
| EP | 1029900 A1 | 8/2000 |
| EP | 1121334 A1 | 8/2001 |
| EP | 1213330 A1 | 6/2002 |
| EP | 1251152 A1 | 10/2002 |
| EP | 1270682 A2 | 1/2003 |
| EP | 1281732 A1 | 2/2003 |
| EP | 1306412 A1 | 5/2003 |
| EP | 0948572 B1 | 7/2003 |
| EP | 1230310 B1 | 9/2003 |
| EP | 1114103 B1 | 10/2003 |
| EP | 1375601 A1 | 1/2004 |
| EP | 1422268 A2 | 5/2004 |
| EP | 1230308 B1 | 8/2004 |
| EP | 1474486 A2 | 11/2004 |
| EP | 1546063 A1 | 6/2005 |
| EP | 1553144 A1 | 7/2005 |
| EP | 1572812 A1 | 9/2005 |
| EP | 1621585 A2 | 2/2006 |
| EP | 1685198 B1 | 5/2007 |
| EP | 1980594 B1 | 6/2009 |
| EP | 0948572 B2 | 1/2010 |
| EP | 1829833 B1 | 1/2010 |
| EP | 1699884 B1 | 2/2010 |
| EP | 1025168 B2 | 8/2010 |
| EP | 1587881 B1 | 12/2010 |
| EP | 2217664 B1 | 6/2011 |
| EP | 2371908 A2 | 10/2011 |
| EP | 2508571 A1 | 10/2012 |
| EP | 2042474 B1 | 3/2013 |

(56) References Cited

FOREIGN PATENT DOCUMENTS

| | | |
|---|---|---|
| EP | 2576702 A1 | 4/2013 |
| EP | 2346949 B1 | 7/2013 |
| EP | 2346950 B1 | 7/2013 |
| EP | 2356181 B1 | 7/2013 |
| EP | 2367889 B1 | 7/2013 |
| EP | 2318463 B1 | 10/2014 |
| EP | 2632988 B1 | 10/2014 |
| EP | 2698403 A1 | 10/2014 |
| JP | 4949173 B | 12/1974 |
| JP | 51143027 | 12/1976 |
| JP | 5869258 A | 4/1983 |
| JP | 6234962 A | 2/1987 |
| JP | 711161 A | 1/1995 |
| JP | 8259840 A | 10/1996 |
| JP | 2005264144 A | 12/1997 |
| JP | 2002509561 A | 3/2002 |
| JP | 2002522618 A | 7/2002 |
| JP | 2005307155 A | 4/2005 |
| JP | 2005515769 A | 6/2005 |
| JP | 2006160683 A | 6/2006 |
| JP | 2010507009 A | 3/2010 |
| JP | 2011504193 A | 2/2011 |
| JP | 2014527573 A | 10/2014 |
| WO | 9638505 A1 | 12/1996 |
| WO | 9746624 A1 | 12/1997 |
| WO | 0021905 A1 | 4/2000 |
| WO | 03006558 A2 | 1/2003 |
| WO | 2004031102 A1 | 4/2004 |
| WO | 2004055119 A1 | 7/2004 |
| WO | 2004087816 A2 | 10/2004 |
| WO | 2006021386 A1 | 3/2006 |
| WO | 2006136435 A2 | 12/2006 |
| WO | 2007115675 A2 | 10/2007 |
| WO | 2008077612 A2 | 7/2008 |
| WO | 2009144005 A1 | 12/2009 |
| WO | 2011147892 A1 | 12/2011 |
| WO | 2012130897 A1 | 10/2012 |
| WO | 2014053454 A1 | 4/2014 |
| WO | 2014094993 A1 | 6/2014 |
| WO | 2015183674 A1 | 12/2015 |

\* cited by examiner

METAL EFFECT PIGMENTS WITH HIGH CHROMA AND HIGH BRILLIANCY, METHOD FOR THE PRODUCTION AND USE THEREOF

CROSS-REFERENCE TO RELATED APPLICATIONS

The present application is the national phase of PCT/EP2015/080864 filed Dec. 21, 2015 and claims priority to European Patent Application No. 14199139.8 filed Dec. 19, 2014, the entire disclosures of which are hereby incorporated by reference herein.

BACKGROUND OF THE INVENTION

Field of the Invention

The present invention relates to metal effect pigments comprising a metallic substrate in platelet form and a coating applied thereto, wherein the coating comprises at least one spacer layer, and to a process for production of the metal effect pigments and to the use thereof.

Description of Related Art

EP 1 270 682 A2 discloses multilayer luster pigments based on a metallic substrate. The luster pigments comprise a plurality of layers composed of (A) at least one layer stack consisting of i) a colorless dielectric layer composed of a material having a refractive index n≤1.8 and ii) a colorless dielectric layer composed of a material having a refractive index n>1.8, and (B) a selectively or nonselectively absorbent layer. EP 1 270 682 A2 does not give any pointer to a spacer layer within the coating.

EP 1 114 103 A1 discloses multilayer pigments based on metal pigments in platelet form, wherein the metal pigments have been coated with an amorphous vitreous layer and subsequently with one or more metal oxides or metal oxide mixtures. There is no description of a spacer layer within the coating in EP 1 114 103 A1.

EP 1 685 198 A2 discloses effect pigments having an aluminum or aluminum alloy core in platelet form and an aluminum oxide- or aluminum oxide/hydroxide-containing layer that surrounds the aluminum or aluminum alloy core and is obtainable by wet-chemical oxidation of the core. The effect pigments have been coated with at least one metal chalcogenide layer of high refractive index, with formation of a mixed layer owing to the porosity of the aluminum oxide- or aluminum oxide/hydroxide-containing layer between the metal chalcogenide layer of high refractive index and the surrounding aluminum oxide- or aluminum oxide/hydroxide-containing layer. The pores that form in the aluminum oxide- or aluminum oxide/hydroxide-containing layer as a result of the wet-chemical oxidation of the core are not arranged essentially parallel to the surface of the aluminum or aluminum alloy core, but distributed randomly in the aluminum oxide- or aluminum oxide/hydroxide-containing layer.

EP 0 708 154 A2 discloses luster pigments based on multiply coated metallic substrates in platelet form, which have at least one layer stack composed of A) a colorless coating having a refractive index of n≤1.8 and B) a selectively absorbent coating with a refractive index n≥2.0 and, if desired, additionally C) an outer colorless or selectively absorbent coating different than the layer B) beneath. EP 0 708 154 A2 does not disclose a spacer layer within the coating.

EP 0 668 329 A2 discloses luster pigments based on multiply coated metallic substrates in platelet form comprising A) a first layer consisting essentially of silicon oxide, silicon oxide hydrate, aluminum oxide and/or aluminum oxide hydrate, B) a second layer consisting essentially of metal and/or nonselectively absorbent metal oxide, and C) if desired a third layer consisting essentially of colorless or selectively absorbent metal oxide. EP 0 668 329 A2 does not contain any pointer to a spacer layer within the coating.

SUMMARY OF THE INVENTION

In some examples, there is provided a metal effect pigment comprising a metallic substrate in platelet form and coating applied to the substrate, wherein the coating comprises a) optionally a layer 1 comprising at least one of metal oxide, metal hydroxide or metal oxide hydrate, where the metal ion comprises or is at least one metal ion selected from the group of metals consisting of Al, Si, Sn, Mo and Zn, b) a layer 2 comprising at least one of metal oxide, metal hydroxide or metal oxide hydrate, c) a layer 3 comprising at least one of metal oxide, metal hydroxide or metal oxide hydrate, at least one of layers 2 and 3 contains at least two different metal ions and layers 2 and 3 are interrupted by a spacer layer.

Also provided are processes for producing the metal effect pigment. Articles comprising at least one absorbent effect pigment of the present invention also are provided.

BRIEF DESCRIPTION OF THE DRAWINGS

The foregoing summary, as well as the following detailed description, will be better understood when read in conjunction with the appended drawings. In the drawings.

DETAILED DESCRIPTION

Figure 1:
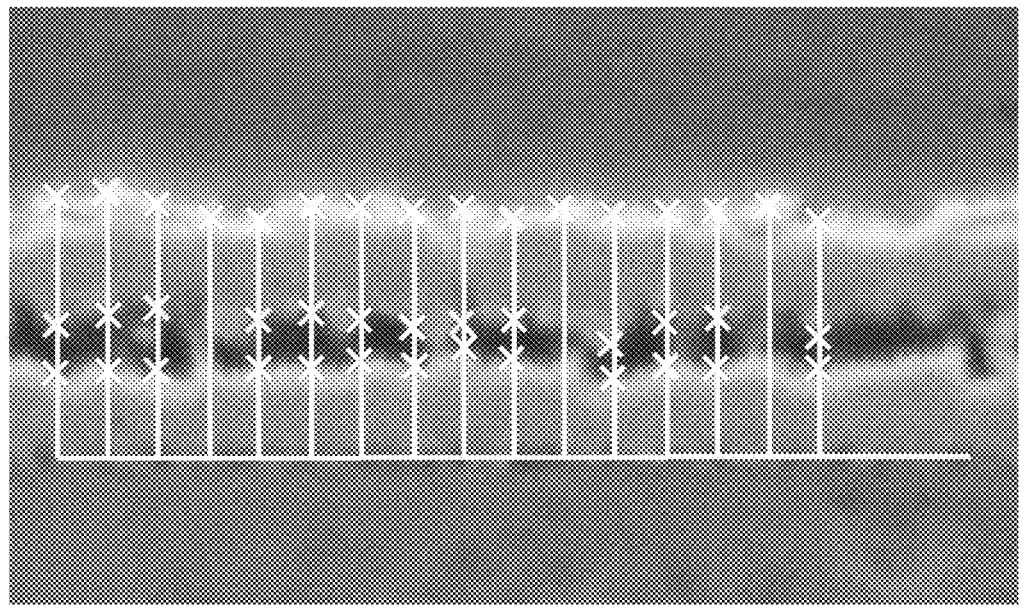
FIG. 1 is a detail of a scanning electron micrograph of a transverse section in 50,000-fold magnification (based on Polaroid 545) with a baseline drawn in at the interface of substrate in platelet form-coating, and lines arranged at right angles to the baseline. "x" marks the points of intersection at the interfaces)

It was an object of the present invention to provide a high-chroma pigment having metallic luster, high brilliance and high hiding capacity, which is simultaneously producible with low material input in a simple manner.

This object is achieved by providing a metal effect pigment comprising a metallic substrate in platelet form and a coating applied to the substrate, wherein the coating includes a) optionally a layer 1 comprising at least one metal oxide, metal hydroxide and/or metal oxide hydrate, where the metal ion comprises or is at least one metal ion selected from the group of metals consisting of Al, Si, Sn, Mo and Zn, b) a layer 2 comprising at least one metal oxide, metal hydroxide and/or metal oxide hydrate, c) a layer 3 comprising at least one metal oxide, metal hydroxide and/or metal oxide hydrate, at least one of layers 2 and 3 contains at least two different metal ions and layers 2 and 3 are interrupted by a spacer layer.

What is meant by "interrupted" in accordance with the invention is that layers 2 and 3 are spaced apart or kept at a distance from one another by a spacer layer.

What is meant by the general expression "metal oxide, metal hydroxide and/or metal oxide hydrate" in accordance with the invention is "metal oxide and/or metal hydroxide and/or metal oxide hydrate". This is also true when the metal or metal ion is specified, for example as titanium (ion), iron (ion), tin (ion), zirconium (ion), etc.

In a preferred embodiment, the optional layer 1 directly adjoins the metallic substrate in platelet form, layer 2 directly follows layer 1 and layer 3 follows layer 2, with layers 2 and 3 interrupted by a spacer layer.

In a further embodiment, layer 2 directly adjoins the metallic substrate in platelet form and layer 3 follows layer 2, with layers 2 and 3 interrupted by a spacer layer.

Preferred developments of the metal effect pigment are given in dependent claims 2 to 9.

The object is additionally achieved by provision of a process for producing the metal effect pigment of the invention, wherein the process comprises the following steps:
(i) optionally applying an uncalcined metal oxide, metal hydroxide and/or metal oxide hydrate layer, where the metal ion comprises or is at least one metal ion selected from the group of metals consisting of Al, Si, Sn, Mo and Zn, to the metallic substrate in platelet form,
(ii) sequentially applying three uncalcined layers A, B and C each consisting of or comprising at least one metal oxide, metal hydroxide and/or metal oxide hydrate, where the layers A, B and C are arranged directly one on top of another and where the at least one metal oxide, metal hydroxide and/or metal oxide hydrate applied in the layer B, in relation to the metal ion, is different than the metal ion(s) of the metal oxides, metal hydroxides and/or metal oxide hydrates of layer A and layer C,
(iii) calcining, optionally under reducing conditions, the product obtained in step (ii) at a temperature from a range from 320° C. to 970° C. to obtain the metal effect pigment comprising at least one spacer layer.

The object is alternatively achieved by provision of a process for producing the metal effect pigment of the invention, wherein the process comprises the following steps:
(i) sequentially applying two uncalcined layers B and C each consisting of or comprising at least one metal oxide, metal hydroxide and/or metal oxide hydrate to a singly or multiply coated metallic substrate, where the layers B and C are arranged directly one on top of another and where the at least one metal oxide, metal hydroxide and/or metal oxide hydrate applied in the layer B, in relation to the metal ion, is different than the metal ion(s) of the metal oxide, metal hydroxide and/or metal oxide hydrate of layer C and of the layer which directly adjoins layer B in substrate direction,
(ii) calcining, optionally under reducing conditions, the product obtained in step (i) at a temperature from a range from 320° C. to 970° C. to obtain the metal effect pigment comprising at least one spacer layer.

The invention further provides for the use of the metal effect pigment of the invention in cosmetic formulations, plastics, films, textiles, ceramic materials, glasses, paints, printing inks, writing inks, varnishes, powder coatings and/or in functional applications, for example for laser marking, IR reflection, photocatalysis.

The object underlying the invention is additionally achieved by provision of an article, wherein the article includes at least one metal effect pigment of the invention.

The metallic substrates in platelet form may be selected from the group consisting of aluminum platelets, copper platelets, zinc platelets, iron platelets, titanium platelets, stainless steel platelets, silver platelets, alloys and mixtures of the above-listed metals. The metallic substrates in platelet form are preferably selected from the group consisting of aluminum platelets, copper platelets, zinc platelets, iron platelets, stainless steel platelets, alloys and mixtures of the above-listed metals. The aforementioned metallic substrates in platelet form may also include one or more coatings composed of or comprising at least one metal oxide, metal hydroxide and/or metal oxide hydrate of high and/or low refractive index and may optionally have been calcined. For instance, the substrates used may thus also be commercially available coated metal effect pigments. In a preferred embodiment, the substrates to be used in accordance with the invention are uncoated metallic substrates in platelet form.

The metallic substrates in platelet form are more preferably selected from the group consisting of aluminum platelets, copper platelets, zinc platelets, iron platelets, alloys and mixtures of the above-listed metals. The metallic substrates in platelet form are most preferably selected from the group consisting of aluminum platelets, copper platelets, zinc platelets, alloys and mixtures of the above-listed metals. Especially preferably, the metallic substrates in platelet form used are aluminum platelets.

If aluminum platelets are used as metallic substrate in platelet form, they preferably have an aluminum content of ≥97% by weight, further preferably of ≥98% by weight, more preferably of ≥99% by weight and most preferably of ≥99.7% by weight, based in each case on the total weight of the aluminum platelet. In a preferred embodiment, the aluminum platelets additionally have a mercury content of preferably ≤1 ppm, an arsenic content of preferably ≤2 ppm, a lead content of preferably ≤10 ppm, a cadmium content of preferably ≤1 ppm, a barium content of preferably ≤10 ppm, a chromium content of preferably ≤20 ppm, a nickel content of preferably ≤20 ppm, a copper content of preferably ≤20 ppm, a cobalt content of preferably ≤20 ppm, an antimony content of preferably ≤2 ppm, a selenium content of preferably ≤10 ppm and a zinc content of preferably ≤20 ppm.

In a further embodiment, the aluminum or aluminum alloy platelets usable as metallic substrate in platelet form have been subjected to wet-chemical oxidation according to claim 1 of WO 96/38505 A1.

If copper platelets are used as metallic substrate in platelet form, they preferably have a copper content of ≥95% by weight, further preferably of ≥96% by weight, more preferably of ≥97% by weight and most preferably of ≥98% by weight, based in each case on the total weight of the copper platelet. In a preferred embodiment, the copper platelets additionally have a mercury content preferably of ≤1 ppm, an arsenic content preferably of ≤3 ppm, a lead content preferably of ≤20 ppm, a cadmium content preferably of ≤15 ppm, a barium content preferably of ≤10 ppm, a chromium content preferably of ≤20 ppm, a nickel content preferably of ≤20 ppm, a cobalt content preferably of ≤20 ppm, an antimony content preferably of ≤2 ppm and a selenium content preferably of ≤10 ppm.

If gold bronze platelets are used as metallic substrate in platelet form, they preferably have a copper content from a range from 70% by weight to 95% by weight, a zinc content from a range from <5% by weight to <30% by weight, an aluminum content from a range from 0.01% by weight to ≤1.5% by weight, a tin content from a range from 0.001% by weight to ≤0.5% by weight, based in each case on the total weight of the gold bronze platelets. In a preferred embodiment, the gold bronze platelets additionally have a mercury content preferably of ≤1 ppm, an arsenic content preferably of ≤3 ppm, a lead content preferably of ≤20 ppm, a cadmium content preferably of ≤15 ppm, a barium content preferably of ≤10 ppm, a chromium content preferably of ≤20 ppm, a nickel content preferably of ≤20 ppm, a cobalt content preferably of ≤20 ppm, an antimony content preferably of ≤2 ppm and a selenium content preferably of ≤10 ppm.

If iron platelets are used as metallic substrate in platelet form, they are preferably produced from carbonyl iron powder that has been subjected to reductive treatment according to claim 1 of EP 1 251 152 A1.

The mean thickness of the metallic substrates in platelet form that are to be coated is preferably within a range from 30 nm to 2000 nm, further preferably within a range from 35 nm to 1500 nm, more preferably within a range from 70 nm to 900 nm and most preferably within a range from 90 nm to 600 nm.

In a further embodiment, the aluminum platelets have a mean thickness according to the respective main claims of WO 2004/087816 A2 or of WO 2008/077612 A2.

In a further embodiment, the iron platelets have a mean thickness according to the main claim of WO 2009/144005 A1.

In one embodiment, the relative standard deviation in the thickness distribution of the metallic substrates in platelet form is 11% to 98%, preferably 22% to 78%, more preferably 28% to 68% and most preferably 34% to 64%. The relative standard deviation in [%] is the quotient of calculated standard deviation and mean thickness.

The mean thickness of the metallic substrate in platelet form can be determined via the method described in WO 2004/087816 A2 or WO 2008/077612 A2. Preferably, the mean thickness of the metallic substrate in platelet form is determined by the method described below under IIh "Determination of the mean thickness of the metallic substrates in platelet form, of the mean layer thickness of layers 1, 2 and 3, of the mean layer thickness of the overall coating, of the mean height $h_a$ of the spacer layer and of the mean height $h_H$ of the cavities". According to the invention, the term "mean" always means the arithmetic mean, unless stated otherwise.

In a preferred embodiment, the metallic substrates in platelet form have an aspect ratio, defined as the quotient of $D_{50}$ and mean thickness, preferably from a range from 2 to 1000, further preferably from a range from 10 to 600, more preferably from a range from 40 to 500 and most preferably from a range from 50 to 300.

The metal effect pigments of the invention optionally comprise a layer 1 comprising at least one metal oxide, metal hydroxide and/or metal oxide hydrate, where the metal ion comprises or is at least one metal ion selected from the group of metals consisting of Al, Si, Sn and Zn. Layer 1 may optionally be present at least partly as a mixed layer with a layer directly adjoining layer 1, for example layer 2.

Layers 2 and 3 of the metal effect pigments of the invention, after calcination, are preferably layers of high refractive index or are each a layer of high refractive index, wherein the refractive index is preferably n>1.8, more preferably n≥1.9 and most preferably n≥2.1. According to the invention, the selection of the at least two different metal ions in layers 2 and/or 3 is made such that the metal oxide(s), metal hydroxide(s) and/or metal oxide hydrate(s) that form therefrom in layers 2 and 3 preferably each has or have an averaged refractive index of n>1.8.

The at least one metal oxide, metal hydroxide and/or metal oxide hydrate of layers 2 and 3 comprises at least two different metal ions, preferably selected from the group of metals consisting of Ti, Fe, Sn, Mn, Zr, Ca, Sr, Ba, Ni, Sb, Ag, Zn, Si, Al, Cu, Ce, Cr and Co, further preferably selected from the group of metals consisting of Ti, Fe, Sn, Si, Al, Mn, Zr, Ag, Zn, Cu and Ce, more preferably selected from the group of metals consisting of Ti, Fe, Sn, Ag, Zr and Ce, and most preferably selected from the group of metals consisting of Ti, Fe and Sn.

The at least two different metal ions are preferably present either in homogeneous distribution in layers 2 and/or 3 or form a gradient therein. In exceptional cases, the at least two different metal ions may also be present in inhomogeneous distribution in layers 2 and/or 3.

What is meant by "at least two different metal ions" in accordance with the invention is that at least two metal ions of different elements are present, for example titanium and iron ions, or titanium and tin ions, or titanium and zirconium ions, or iron and tin ions, or iron and zirconium ions, etc. The various metal ions may be present in layer 2 and/or layer 3 of the metal effect pigment of the invention in a mixture of metal oxides and/or metal hydroxides and/or metal oxides hydrates and/or else in mixed oxides and/or mixed hydroxides and/or mixed oxide hydrates. Layer 2 and/or layer 3 may comprise or consist of this mixture of metal oxides and/or metal hydroxides and/or metal oxide hydrates and/or mixed oxides and/or mixed hydroxides and/or mixed oxide hydrates.

In one embodiment, one of the two layers 2 and 3 comprises only one kind of metal ion, selected from the group of metals consisting of Fe, Ti, Sn, Zr and Zn, more preferably consisting of Fe, Ti and Sn. Correspondingly, the respective other layer of the two layers 3 and 2 includes at least two different metal ions, preferably selected from the group of metals consisting of Fe, Ti, Sn, Zr and Zn, further preferably consisting of Ti, Sn and Zr.

In a preferred embodiment, both layer 2 and layer 3 comprise at least one metal oxide, metal hydroxide and/or metal oxide hydrate, where the metal ions of the at least one metal oxide, metal hydroxide and/or metal oxide hydrate comprise or are at least two different metal ions, preferably selected from the group of metals consisting of Fe, Ti, Sn, Zr and Zn, further preferably consisting of Fe, Ti, Sn and Zr.

The metal oxide, metal hydroxide and/or metal oxide hydrate contents of the metal effect pigments of the invention are determined as the respective metal oxide by means of x-ray fluorescence analysis (XRF) from the powder bed and, as the case may be, are calculated as the respective elemental metal.

The mean layer thickness of layer 1 of the metal effect pigments of the invention is preferably within a range from 1 nm to 200 nm, more preferably within a range from 2 nm to 100 nm and most preferably within a range from 5 nm to 50 nm.

The mean layer thickness of each of layers 2 and 3 of the metal effect pigments of the invention is preferably within a range from 30 nm to 300 nm, further preferably within a range from 35 nm to 250 nm, more preferably within a range from 40 nm to 230 nm and most preferably within a range from 50 nm to 180 nm.

In a preferred embodiment, the mean layer thickness of layers 2 and 3 is virtually the same. What is understood by "virtually the same mean layer thicknesses" in accordance with the invention is that the quotient of the mean layer thickness of layer 2 and the mean layer thickness of layer 3 is preferably within a range from 0.5 to 1.8, further preferably within a range from 0.7 to 1.6, more preferably within a range from 0.8 to 1.4 and most preferably within a range from 0.9 to 1.2.

In a further embodiment, in the case of a different physical composition of layers 2 and 3, the respective optical layer thickness thereof is virtually the same, where the optical layer thickness of layers 2 and 3 may or may not follow the known lambda/4 rule. The optical layer thickness is defined as the product of refractive index and mean layer thickness of the respective layer.

The optical layer thickness of each of layers 2 and 3 of the metal effect pigments of the invention is preferably ≤1000 nm. Preferably, the optical layer thicknesses of each of layers 1, 2 and 3 is within a range from 50 nm to 850 nm, more preferably within a range from 80 nm to 820 nm and most preferably within a range from 100 nm to 800 nm.

The mean layer thickness of the overall coating of the metal effect pigments of the invention is preferably ≤750 nm. The mean layer thickness of the overall coating is preferably within a range from 50 nm to 550 nm, more preferably within a range from 78 nm to 430 nm and most preferably within a range from 95 nm to 340 nm.

"Overall coating" is understood to mean the complete coating which proceeds from the substrate surface and extends perpendicularly therefrom in one direction.

In one embodiment, the relative standard deviation of the layer thickness distribution of each of layers 2 and 3 is 2% to 74%, preferably 3% to 63%, more preferably 4% to 57% and most preferably 5% to 49%, and the relative standard deviation of the layer thickness distribution of the overall coating is 0.3% to 31%, preferably 1% to 27%, more preferably 1.2% to 24% and most preferably 1.9% to 22%. The relative standard deviation in [%] is the quotient of calculated standard deviation and mean thickness.

The spacer layer between layers 2 and 3 is preferably arranged essentially parallel to the surface of the metallic substrate in platelet form. What is understood by "essentially parallel" in the context of this invention is that, in a scanning electron micrograph of a transverse section, a regression line drawn through a spacer layer, in relation to a regression line drawn at the surface of the metallic substrate in platelet form, has a slope of preferably close to 0.

Figure 3:
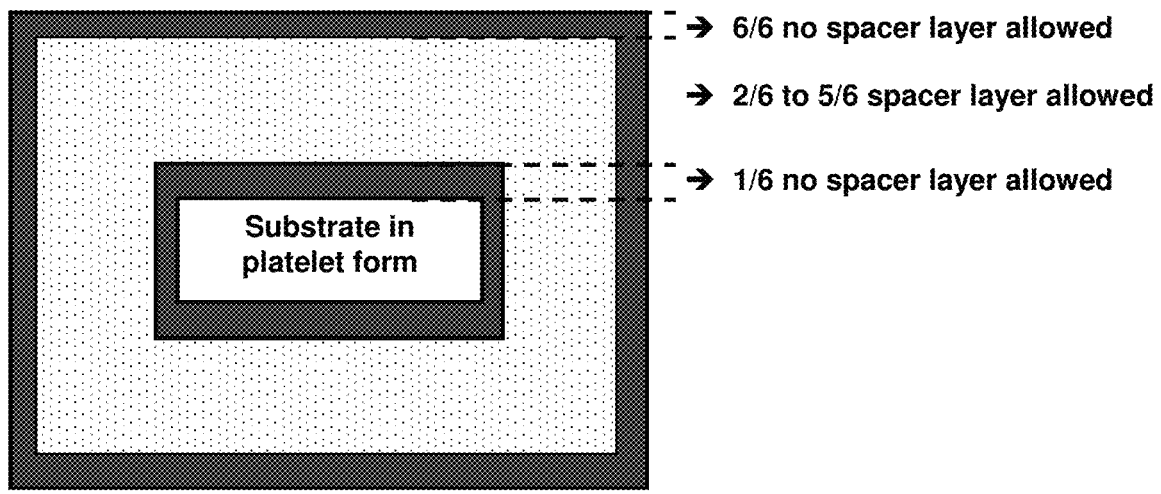
FIG. 3 is a schematic diagram of the position of the spacer layer.

The position of the spacer layer within the overall coating may vary. If, for example, the mean layer thicknesses of layers 1, 2 and 3 are virtually identical, the spacer layer, in relation to the overall coating, is in about the middle of the overall coating, preferably composed of optional layer 1 and layers 2 and 3. The spacer layer is preferably arranged between the first sixth and the sixth sixth of the overall coating in relation to the overall coating. The first sixth here refers to the proportion facing the metallic substrate in platelet form, and the sixth sixth to the proportion of the overall coating, preferably composed of optional layer 1 and layers 2 and 3, remote from the metallic substrate in platelet form (FIG. 3).

The spacer layer formed between layers 2 and 3 preferably has connections, which can also be referred to as spacers, which on the one hand connect the layers adjoining on either side of the spacer layer and on the other hand keep them spaced apart. As apparent from scanning electron micrographs of transverse sections, these connections or spacers, for example in the form of bars or columns, may be arranged at an angle of about 90°, for example of 80° to 100°, to the surface of the metallic substrate in platelet form. However, they may also assume any other angle between 5° and 175°. Preferably, the spacers, especially the bars, preferably the longitudinal axes thereof, are arranged at an angle from a range from 15° to 150° and more preferably at an angle from a range from 35° to 135°, in each case to the surface of the metallic substrate in platelet form. In the determination of the angle, the substrate plane forms the first limb. One of the outsides of the bar in question in each case forms the second limb. The angle formed is determined proceeding from the angle vertex of the two limbs, with 0° being assumed to lie to the left and 180° to the right in the substrate plane in the top view of the scanning electron micrographs of transverse sections.

The connections or spacers may assume various geometric forms and are preferably distributed homogeneously over the full area of the entire spacer layer. For example, the connections or spacers may take the form of meshes, grids, ladders, sponges or honeycombs. It may also be possible to identify some structural elements similar to those in a photonic or inverse photonic crystal, as known, for example, from EP 2 371 908 A2, EP 1 546 063 A1 or EP 1 121 334 A1.

The connections or spacers comprise an at least one metal oxide, metal hydroxide and/or metal oxide hydrate. In a preferred embodiment, the connections or spacers comprise an identical physical composition to the layers on either side of the spacer layer. It is also alternatively possible for a gradient between various metal oxides, metal hydroxides and/or metal oxide hydrates to be formed within the connections or spacers.

In a preferred embodiment, the connections or spacers comprise a metal oxide, metal hydroxide and/or metal oxide hydrate, where the metal ions of the metal oxides, metal hydroxides and/or metal oxide hydrates comprise or are at least two metal ions selected from the group of metals consisting of Ti, Fe, Sn, Mn, Zr, Ca, Sr, Ba, Ni, Ag, Si, Al, Zn, Cu, Ce, Cr and Co, further preferably from the group consisting of Ti, Fe, Sn, Mn, Zr, Ag, Si, Al, Zn, Cu and Ce, more preferably from the group consisting of Ti, Fe, Sn, Zr, Ag and Ce, and most preferably from the group consisting of Ti, Fe and Sn.

The inventors assume that the connections or spacers can also bring about mechanical stabilization of the adjoining layers and hence of the metal effect pigment of the invention. Probably because of the number of connections or spacers, the different angles and geometric forms that the connections or spacers can assume within the spacer layer, and the distribution thereof in a preferably homogeneous manner over the full area of the spacer layer, a mechanically very stable metal effect pigment is formed. The adhesion between the overall coating and the metallic substrate in platelet form is very good in the metal effect pigments of the invention. Even extreme shear conditions as occur in what is called the Waring blender test are withstood by the metal effect pigments of the invention without detectable damage. The procedure of the Waring blender test is described hereinafter in section IIf "Waring blender test".

As well as their surprisingly good mechanical stability, the metal effect pigments of the invention have excellent chemical stability and outstanding gassing stability, as elucidated in the details which follow in section IIk "Chemicals test" and section IIi "Gassing test".

The spacer layer of the metal effect pigments of the invention preferably has a mean height $h_a$ from a range from 5 nm to 120 nm, further preferably from a range from 10 nm to 105 nm, more preferably from a range from 12 nm to 90 nm and most preferably from a range from 15 nm to 55 nm.

To determine the mean height $h_a$ of the spacer layer, the mean layer thickness of layers 1, 2 and 3 and the mean layer thickness of the overall coating, scanning electron micrographs of transverse sections are used to establish the upper and lower substrate surfaces as baselines. What is meant by the upper and lower substrate surfaces in the scanning electron micrographs of transverse sections is the longer side of the metallic substrate in platelet form in each case. The baseline is drawn along the surface of the metallic substrate in platelet form in the scanning electron micrograph of the transverse section by connecting the two points of intersection of substrate—optional layer 1 or of substrate—layer 2 from the left- and right-hand edges of the scanning electron micrograph of the transverse section to one another by means of a straight line.

The scanning electron micrographs of transverse sections were analyzed with the aid of the AxioVision 4.6.3 image processing software (from Zeiss).

A sufficient number of parallel lines are drawn at 50 nm intervals at a 90° angle with respect to the upper and lower baselines corresponding to the two surfaces of the substrate in platelet form that a grid has been placed over the effect pigment shown in the scanning electron micrograph of the transverse section (FIG. 1). The magnification of the scanning electron micrograph of the transverse section is preferably at least 50 000-fold, based on Polaroid 545 (4"×5"). Proceeding from the respective baseline of the metallic substrate in platelet form, in the direction of the respective outer layer 3 or the respective outermost layer, the points of intersection between the parallel lines arranged at right angles to the respective baseline with the respective interfaces of the optional layer 1 with layer 2, of layer 2 with the spacer layer, of the spacer layer with layer 3, and of layer 3 with the environment or with any further layer applied are analyzed manually. It may be the case here that one of the lines drawn at 50 nm intervals occurs directly above a connection point or a spacer. In this case, only the respective point of intersection of the line at the interface of layer 3 with the environment or with any further layer applied is recorded.

These measurements give rise to the layer thicknesses of layers 1, 2 and 3, the layer thickness of the overall coating, the layer thickness of further layers optionally present, and the height $h_a$ of the spacer layer by formation of differences. The layer thickness of layer 1 is calculated from the difference between the respective measured points of intersection at the respective interfaces of layer 1 with layer 2 and the respective baseline. The layer thickness of layer 2 is calculated from the difference between the respective measured points of intersection at the respective interfaces of layer 2 with the spacer layer and of either optional layer 1 with layer 2 or the baseline with layer 2 if the nonmetallic substrate in platelet form has not been covered with further layers beforehand. The layer thickness of layer 3 is calculated from the difference between the respective measured points of intersection of layer 3 with the environment or any further layer applied and of the spacer layer with layer 3. The layer thickness of the overall coating is calculated from the difference between the respective points of intersection of layer 3 with the environment or any further layer applied with the environment and the respective baseline. The height $h_a$ of the spacer layer is calculated from the difference between the respective measured points of intersection of spacer layer with layer 3 and layer 2 with the spacer layer. The layer thickness of any further layers applied can be determined analogously and should be taken into account correspondingly in forming the differences.

The above-described method is also employed correspondingly for determination of the thickness of the metallic substrate in platelet form.

The individual values of the thickness of the substrate, the layer thicknesses and the height $h_a$ that have been determined in this way are used to form the respective arithmetic means in order to determine the above-specified values for the mean thickness of the metallic substrate in platelet form, the respective mean layer thickness and the mean height $h_a$. To be statistically meaningful, the above-described measurements are conducted on at least 100 of the parallel lines arranged at right angles to the baseline.

In addition, with the aid of the above-described lines that are drawn at 50 nm intervals in a scanning electron micrograph, the number of connections per micrometer is determined.

In addition, with the aid of the above-described lines drawn at 50 nm intervals in a scanning electron micrograph, the number of connections or spacers per micrometer and the network density, defined as the number of connections or spacers per number of lines in percent, is determined.

If the metal effect pigments of the invention have more than one spacer layer within the overall coating, the method just described for measuring the individual layers and the spacer layers is applied correspondingly.

The height $h_{ma}$ refers to the midpoint of the spacer layer. It is calculated as the sum total of the layer thickness of the optional layer 1 and of layer 2 and half the height $h_a$ of the spacer layer. The relative height of the midpoint of the spacer layer $h_{Rma}$ is formed from the ratio of $h_{ma}$ and the layer thickness of the overall coating. The standard deviation of the relative height $\sigma h_{Rma}$ is preferably within a range from 0.2% to 18%, further preferably within a range from 0.3% to 15%, more preferably within a range from 0.4% to 11% and most preferably within a range from 0.5% to 8%. The standard deviation of the relative height $\sigma h_{ma}$ is a measure of the extent to which the spacer layer is in a defined position parallel to the surface of the metallic substrate in platelet form within the entire coating.

If the metal effect pigments of the invention have at least one further spacer layer, the height $h_{ma}$ thereof and the relative height of the midpoint of the at least one further spacer layer $h_{Rma}$ thereof are also ascertained via the above-described method using scanning electron micrographs of transverse sections. The above-specified values for standard deviation of the relative height $\sigma h_{Rma}$ apply correspondingly to further spacer layers.

The person skilled in the art is aware that metal effect pigments that have been coated with at least one metal oxide, metal hydroxide and/or metal oxide hydrate have statistically distributed pores within the coating. These metal effect pigments from the prior art do not have a spacer layer. The spacer layer and the cavities present within the spacer layer in the metal effect pigments of the invention, by contrast, are not statistically distributed within the entire coating, but are arranged parallel to the surface of the metallic substrate in platelet form within the entire coating.

The distances of the midpoints of the statistically distributed pores from the substrate surface were likewise determined by means of scanning electron micrographs of transverse sections by the method described above. For this purpose, a sufficient number of parallel lines were drawn at 50 nm intervals at a 90° angle with respect to the upper and lower baselines corresponding to the two surfaces of the substrate in platelet form that a grid has been placed over the metal effect pigment without a spacer layer shown in the scanning electron micrograph of a transverse section. If one of the parallel lines occurred above one or more pores, the height(s) thereof, the pore midpoint(s) thereof and the distance of the pore midpoint(s) from the substrate surface were determined. The statistical distribution of the pore midpoints can likewise be used to determine a standard deviation. The standard deviation of the distances of the midpoints of the statistically distributed pores from the substrate surface is >20% in metal effect pigments from the prior art, i.e. in the case of metal effect pigments without a spacer layer. The standard deviation of the distances of the midpoints of the statistically distributed pores from the substrate surface is thus distinctly different in terms of its value from the standard deviation of the relative height of the midpoint of the spacer layer of the metal effect pigments of the invention having at least one spacer layer.

It is thus possible to compare the standard deviation of the distances of the pore midpoints from the substrate surface of metal effect pigments without a spacer layer with the standard deviation of the relative height of the midpoint of the spacer layer of metal effect pigments of the invention having at least one spacer layer.

The scanning electron micrographs were obtained using transverse sections of the metal effect pigments of the invention with the Supra 35 scanning electron microscope (from Zeiss).

In one embodiment, the relative standard deviation in the height distribution of the spacer layer is 4% to 75%, preferably 7% to 69%, more preferably 9% to 63% and most preferably 13% to 60%. The relative standard deviation in [%] of the height distribution is the quotient of the calculated standard deviation and the mean height.

In a preferred embodiment, the metal effect pigments of the invention, within the at least one spacer layer, have a number of connections or spacers per micrometer from a range from 0 to 11, further preferably from a range from 0 to 9, more preferably from a range from 1 to 7 and most preferably from a range from 1 to 3.

In a preferred embodiment, the metal effect pigments of the invention, within the at least one spacer layer, have a network density, defined as the number of connections or spacers per number of lines in percent, of <85%, preferably from a range from 1% to 75%, more preferably from a range from 1% to 63% and most preferably from a range from 1% to 49%.

Above a network density of 85%, in the context of this invention, reference is no longer made to a spacer layer since the high proportion of connections or spacers then leads to a very substantially continuous coating.

In a further preferred embodiment, the metal effect pigments of the invention comprise at least one spacer layer arranged essentially parallel to the surface of the metallic substrate in platelet form, where the at least one spacer layer in each case has a mean height $h_a$ from a range from 19 nm to 83 nm, more preferably from a range from 27 nm to 66 nm and most preferably from a range from 33 nm to 57 nm.

In a particularly preferred embodiment, the metal effect pigments of the invention have at least one spacer layer of mean height $h_a$ from a range from 5 nm to 100 nm, preferably from a range from 11 nm to 79 nm and most preferably from a range from 23 to 57 nm, where the network density within the at least one spacer layer is selected from a range from 1% to 85%, preferably from a range from 2% to 75%, more preferably from a range from 3% to 70% and most preferably from a range from 5% to 65%.

The spacer layer comprises cavities as well as the above-described connections or spacers. These cavities are spatially bounded by layers 2 and 3 and the connections or spacers.

Energy-dispersive x-ray microanalysis (EDX analysis) of these cavities does not permit any conclusion as to whether the material is solid or liquid, and so the inventors are assuming, with the methods of analysis available at present, that the cavities within the spacer layer comprise a gas, probably air. The adjoining connections or spacers, by contrast, comprise at least one metal oxide, metal hydroxide and/or metal oxide hydrate, as detailed above.

The cavities within the spacer layer of the metal effect pigments of the invention may assume a mean height $h_H$ from a range from 2 nm to 119 nm, preferably from a range from 6 nm to 105 nm, more preferably from a range from 11 nm to 85 nm and most preferably from a range from 18 nm to 53 nm. The height $h_H$ is understood to mean the greatest difference between the uppermost and lowermost cavity boundaries. It is determined by the method described above for the height $h_a$, by drawing parallel lines at 50 nm intervals at a 90° angle to the surface of the metallic substrate in platelet form in scanning electron micrographs of transverse sections. The difference of the two points of intersection of these lines with the upper and lower cavity boundaries is the height $h_H$. Here too, to be statistically meaningful, the above-described measurements are conducted on at least 100 lines.

Therefore, the mean height $h_a$ is a maximum value for the mean height $h_H$. Accordingly, it is also possible for a plurality of cavities to be present one above another within the spacer layer.

The mean height of the spacer layer $h_a$ and the mean height of the cavities $h_H$ are determined, using a cured lacquer film in which the metal effect pigments of the invention are aligned essentially plane-parallel to the substrate, according to the details given in section IIh "Determination of the mean thickness of the metallic substrates in platelet form, the mean layer thickness of layers 1, 2 and 3, the mean layer thickness of the overall coating, the mean height $h_a$ of the spacer layer and the mean height $h_H$ of the cavities". For this purpose, a transverse section of the cured lacquer film is examined under a scanning electron microscope (SEM), as described above for $h_a$. As an alternative to these transverse sections, the metal effect pigments of the invention can also be cut by means of the FIB method (FIB=focused ion beam). For this purpose, a fine beam of highly accelerated ions (for example gallium, xenon, neon or helium) is focused to a point by means of ion optics and guided line by line over the effect pigment surface to be processed. On impact with the effect pigment surface, the ions release most of their energy and destroy the coating at this point, which leads to removal of material line by line. It is also possible using the scanning electron micrographs that have then been recorded, by the method described above, to determine the mean height $h_a$, the mean layer thickness of layers 1, 2 and 3 and the mean layer thickness of the overall coating. The mean thickness of the metallic substrate in platelet form can alternatively be determined using scanning electron micrographs of the effect pigments that have been cut by the FIB method.

In a further embodiment, the metal effect pigments of the invention comprise, within the spacer layer, distributed over the entire metal effect pigment and measured using scanning electron micrographs of transverse sections, an area proportion of cavities from a range from 51% to 99%, preferably from a range from 63% to 96%, more preferably from a range from 76% to 95% and most preferably from a range from 84% to 94%, and an area proportion of connections or spacers from a range from 1% to 49%, preferably from a range from 4% to 37%, more preferably from a range from 5% to 24% and most preferably from a range from 6% to 16%.

It is further preferable that the total volume occupied by the connections or spacers in the spacer layer is less than the total volume occupied by the cavities. Preferably, the total volume occupied by the connections or spacers in the spacer layer is less than 50% by volume, further preferably less than 30% by volume, more preferably less than 20% by volume and most preferably less than 10% by volume of the total volume occupied by the cavities.

The metal effect pigments of the invention are notable for exceptional gloss and high chroma.

The gloss of the metal effect pigments of the invention is determined using white/black hiding cards with the aid of a Micro-Tri-Gloss gloss meter from Byk-Gardner, according to the details given hereinafter in section IId "Gloss measurements". The chroma of the metal effect pigments of the invention is likewise determined using white/black hiding charts with the BYK-mac multi-angle colorimeter (from Byk-Gardner), according to the details given hereinafter in section IIc "Angle-dependent color measurements". Further optical effects, such as sparkles and graininess, are determined according to the details given hereinafter in section IIe "Effect measurements".

In one embodiment, the metal effect pigments of the invention comprise, as well as the above-described layers 1, 2 and 3, further layers of high and/or low refractive index, which may either be arranged, viewed from the metallic substrate in platelet form, either below the optional layer 1 or layer 2 and/or above layer 3. These further layers may comprise metal oxides, metal hydroxides, metal oxide hydrates, where the metal ions of the metal oxides, metal hydroxides, metal oxide hydrates comprise or are at least one metal ion from the group of metals consisting of Ti, Fe, Sn, Mn, Zr, Ca, Sr, Ba, Ni, Ag, Si, Al, Zn, Cu, Ce, Cr and Co, preferably selected from the group of metals consisting of Ti, Fe, Sn, Zr, Ag, Si, Al, Zn, Cu, Ce, Cr and more preferably selected from the group of metals consisting of Ti, Fe and Sn. Moreover, these further layers may comprise semitransparent metals selected from the group consisting of Ag, Al, Cr, Ni, Au, Pt, Pd, Cu, Zn and Ti, preferably selected from the group consisting of Ag, Au and Cu, the alloys of each and/or mixtures thereof.

In one embodiment, each of the layers of the metal effect pigments of the invention may be provided with a dopant, where the dopant may comprise metal oxides, metal hydroxides and/or metal oxide hydrates, and the metal ions of the metal oxides, metal hydroxides and/or metal oxide hydrates comprise or are at least one metal ion selected from the group of metals consisting of Ca, Mg, Al, Ce, Zr or Sn, preferably Al, Zr or Sn. The portion of dopant preferably totals≤1% by weight, more preferably totals≤0.5% by weight and most preferably totals≤0.2% by weight, based in each case on the total weight of the metal effect pigments.

In a further embodiment, the overall coating of the metal effect pigments of the invention may, as well as the spacer layer, comprise at least one further spacer layer also arranged essentially parallel to the surface of the metallic substrate in platelet form between layers 2 and 3. Preferably, the metal effect pigments of the invention have not more than four spacer layers within the overall coating, since the optical quality thereof then decreases. According to the invention, even when the metal effect pigment of the invention comprises more than one spacer layer, in relation to the overall coating, there is no spacer layer either in the first sixth or in the sixth sixth of the overall coating.

The metal effect pigments of the invention may have any median particle size $D_{50}$. The $D_{50}$ values of the metal effect pigments of the invention are preferably within a range from 3 µm to 150 µm. Preferably, the $D_{50}$ values of the metal effect pigments of the invention are within a range from 4 µm to 170 µm, further preferably within a range from 5 µm to 140 µm, more preferably within a range from 7 µm to 90 µm and most preferably within a range from 9 µm to 56 µm. Extremely preferably, the metal effect pigments of the invention have a $D_{50}$ from a range of 6 µm to 14 µm or from a range from 15 µm to 35 µm.

The $D_{10}$ values of the metal effect pigments of the invention preferably encompass a range from 1 µm to 60 µm; further preferably, the $D_{10}$ values are within a range from 2 µm to 40 µm and more preferably within a range from 4 µm to 31 µm. Most preferably, the $D_{10}$ values are within a range from 5 µm to 19 µm.

The $D_{90}$ values of the metal effect pigments of the invention preferably encompass a range from 10 µm to 600 µm; further preferably, the $D_{90}$ values of the metal effect pigments of the invention are within a range from 30 µm to 200 µm, more preferably within a range from 40 µm to 150 µm and most preferably within a range from 45 µm to 120 µm.

The $D_{10}$, $D_{50}$ and $D_{90}$ values of the cumulative frequency distribution of the volume-average size distribution function, as obtained by laser diffraction methods, indicate that, respectively, 10%, 50% and 90% of the metal effect pigments of the invention have a volume-average diameter less than or equal to the value specified in each case. The size distribution curve of the metal effect pigments is determined with the Cilas 1064 instrument from Quantachrome. The scattered light signals are evaluated by the Fraunhofer theory, which also includes diffraction and absorption characteristics of the particles.

In one embodiment, the metal effect pigments of the invention have a span $\Delta D$, defined as $\Delta D = D_{90} - D_{10}/D_{50}$, from a range from 0.7 to 2.5, preferably from a range from 0.8 to 2.2, further preferably from a range from 0.9 to 1.9, more preferably from a range from 0.9 to 1.8 and most preferably from a range from 1 to 1.7.

The metal effect pigments of the invention can be produced as follows:

- suspending the metallic substrates in platelet form in a suitable solvent at a temperature from a range from 50 to 100° C.,
- optionally applying a metal oxide, metal hydroxide and/or metal oxide hydrate layer, where the metal ion comprises or is at least one metal ion selected from the group of metals consisting of Si, Al, Sn, Mo and Zn,
- sequentially applying three uncalcined layers A, B and C each consisting of or comprising at least one metal oxide, metal hydroxide and/or metal oxide hydrate, where the layers A, B and C are arranged directly one on top of another and where the at least one metal oxide, metal hydroxide and/or metal oxide hydrate applied in the layer B, in relation to the metal ion, is different than the metal ion(s) of the metal oxides, metal hydroxides and/or metal oxide hydrates of layer A and layer C,
- separating the coated substrates from the coating solution(s), and optionally washing and/or optionally drying the coated substrates,
- calcining, optionally under reducing conditions, at temperatures from a range from 320° C. to 970° C., preferably from a range from 400° C. to 930° C. and more preferably from a range from 500° C. to 750° C. to obtain the metal effect pigments of the invention comprising at least one spacer layer.

In a preferred embodiment, the metal effect pigments of the invention are produced by the above process.

The deposition of the respective metal oxides, metal hydroxides and/or metal oxide hydrates can be effected under aqueous conditions or in organic solvents. Under aqueous conditions, the pH should preferably be kept constant here within a range from pH 1.4 to 10.0 depending on the metal salt. In organic solvents, preference is given to hydrolysis of the respective alkoxides for deposition.

In addition to the at least three sequentially applied, preferably deposited, metal oxides, metal hydroxides and/or metal oxide hydrates, it is of course also possible for further metal oxides, metal hydroxides and/or metal oxide hydrates to be applied beforehand and/or subsequently, such that further layers may be arranged beneath or above the layer sequence [optional layer 1/layer 2/spacer layer/layer 3].

In the course of calcining, there is surprisingly diffusion presumably of the metal ions present in the layer B into layer A and/or layer C to form mixed metal oxides and/or mixed metal hydroxides and/or metal oxide hydrates and mixtures thereof. Because of the diffusion of the metal ions from layer B into layer A and/or layer C, layers 2 and 3 of the invention and the intermediate spacer layer are formed in the course of calcining, with at least one of the two layers 2 and 3 comprising at least two different metal ions. The originally three successively deposited layers A, B and C thus give rise, in the course of calcining, to layers 2 and 3 and the intervening spacer layer, with at least one of the two layers 2 and 3 comprising at least two different metal ions.

It is assumed that the different mobility of the metal oxides, metal hydroxides and/or metal oxide hydrates with respect to one another in the course of calcining is one of the factors responsible for the formation of the spacer layer. In this context, the mobility of the metal ions present in layer B competes with the mobility of the metal ions present in layers A and/or C, assuming that the metal ions diffuse out of layer B into at least one of the adjoining layers A and/or C and the metal ions diffuse from at least one of layers A and/or C into layer B. The inventors are assuming at present that, if the mobility of the metal ions present in layer B during the calcination is higher than the mobility of the metal ions present in layers A and/or C, is one of the possible explanations for the formation of the spacer layer. Furthermore, it is assumed that a concentration gradient in relation to the metal ions promotes the formation of a spacer layer, i.e. when more mobile metal ions can diffuse out of layer B into one of the adjoining layers A and/or C than in the reverse direction. In summary, it has been found that the formation of a spacer layer is caused by a complex interplay of a wide variety of different further factors, for example entropic and/or enthalpic effects, during the calcination, but these have not yet been conclusively clarified. For the formation of at least one further spacer layer, the above considerations naturally apply correspondingly.

In a preferred embodiment, the first and third of the three sequentially applied, preferably deposited, metal oxides, metal hydroxides and/or metal oxide hydrates comprise at least one metal ion selected from the group of metals consisting of Fe, Ti, Sn and Zr. The first and third metal oxides, metal hydroxides and/or metal oxide hydrates, after application, respectively produce layer A and layer C. The second of the three sequentially applied, preferably deposited, metal oxides, metal hydroxides and/or metal oxide hydrates produces layer B and comprises at least one metal ion selected from the group of metals consisting of Fe, Sn, Zr, Ti and Ce, which is different than the metal ions of the metal oxides, metal hydroxides and/or metal oxide hydrates deposited for production of layer A and layer C. In layer A and layer C, the metal oxides, metal hydroxides and/or metal oxide hydrates applied, preferably deposited, may be the same or different in relation to the metal ion(s).

Alternatively, the metal effect pigments of the invention can be produced as follows:
suspending the calcined, singly or multiply coated metallic substrates in platelet form in water at a temperature from a range from 50 to 100° C.,
sequentially applying two uncalcined layers B and C in the form of metal oxides, metal hydroxides and/or metal oxide hydrates by sequential addition of two water-soluble metal salts, in each case with simultaneous addition of mineral alkali, where the first water-soluble metal salt—for production of layer B—is different in relation to the metal ion than the other water-soluble metal salt for production of layer C and different in relation to the metal ion than the layer that directly adjoins layer B in substrate direction,
separating the coated substrates from the coating solution(s), and optionally washing and/or optionally drying the coated substrates,
calcining at temperatures from a range from 350° C. to 1100° C., preferably from a range from 625° C. to 930° C. and more preferably from a range from 750° C. to 890° C. to obtain the metal effect pigments of the invention comprising at least one spacer layer.

In this alternative method too, the deposition of the respective metal oxides, metal hydroxides and/or metal oxide hydrates is preferably effected at a constant pH within a range from pH 1.4 to 10.0 depending on the metal salt.

It is suspected that, in the course of calcining, the metal ions present in the layer B diffuse into layer C to form mixed metal oxides and/or mixed metal hydroxides and/or metal oxide hydrates and/or mixtures of metal oxides and/or metal hydroxides and/or metal oxide hydrates in layer C. Because of the diffusion of the metal ions from layer B into layer C and/or different in relation to the metal ion than the layer that directly adjoins layer B in substrate direction, the calcination forms layer 3 of the invention and the intervening spacer layer. The originally two successively deposited layers B and C thus give rise, in the course of calcining, to layer 3 and the intervening spacer layer, with at least layer 3 comprising at least two different metal ions.

In a particularly preferred embodiment, the three sequentially applied, preferably deposited, metal oxides, metal hydroxides and/or metal oxide hydrates for production of the layers B and C or A, B and C do not comprise any metal ion(s) exclusively selected from the group of metals consisting of Si, Mg and Al.

In the case of sequential application of two uncalcined layers B and C to an already coated and optionally calcined substrate, that layer to which the layer B is applied, in accordance with the invention, comprises a metal oxide, metal hydroxide and/or metal oxide hydrate of high refractive index.

In the case of sequential application of three uncalcined layers A, B and C to an already coated and optionally calcined substrate, that layer to which the layer A is applied, in accordance with the invention, may comprise a metal oxide, metal hydroxide and/or metal oxide hydrate of high or low refractive index.

The calcination under reducing conditions is preferably effected in the presence of forming gas ($N_2/H_2$).

The above remarks are elucidated in detail hereinafter by way of example with reference to various coatings.

If, for example, a water-soluble titanium(IV) salt, a water-soluble iron(III) salt and a water-soluble titanium(IV) salt again are added successively to a suspension of an $SiO_2$- coated metallic substrate in platelet form, the final calcination, viewed proceeding from the substrate in the SEM transverse section, following the $SiO_2$ coating already present, gives rise to a layer 2 comprising a metal oxide, metal hydroxide and/or metal oxide hydrate, where the metal ions of the metal oxide, metal hydroxide and/or metal oxide hydrate comprise or are titanium ions and/or iron ions, a spacer layer, and a layer 3 comprising a metal oxide, metal hydroxide and/or metal oxide hydrate, where the metal ions of the metal oxide, metal hydroxide and/or metal oxide hydrate comprise or are titanium ions and/or iron ions.

If, for example, a water-soluble titanium(IV) salt, a water-soluble tin(IV) salt and a water-soluble titanium(IV) salt again are added successively to a suspension of an $SiO_2$-coated metallic substrate in platelet form, the final calcination, viewed proceeding from the substrate in the SEM transverse section, following the $SiO_2$ coating already present, gives rise to a layer 2 comprising a metal oxide, metal hydroxide and/or metal oxide hydrate, where the metal ions of the metal oxide, metal hydroxide and/or metal oxide hydrate comprise or are titanium ions and/or tin ions, a spacer layer, and a layer 3 comprising a metal oxide, metal hydroxide and/or metal oxide hydrate, where the metal ions of the metal oxide, metal hydroxide and/or metal oxide hydrate comprise or are titanium ions and/or tin ions.

If, for example, a water-soluble titanium(IV) salt is added to a suspension of a calcined, $SiO_2$-coated metallic substrate in platelet form and calcined following deposition of titanium dioxide, titanium hydroxide and/or titanium oxide hydrate, this product is resuspended after the calcination and a water-soluble tin(IV) salt and a water-soluble titanium(IV) salt again are added successively, another final calcination, viewed proceeding from the substrate in the SEM transverse section, following the $SiO_2$ coating already present and layer 2 comprising a metal oxide, metal hydroxide and/or metal oxide hydrate, where the metal ion of the metal oxide, metal hydroxide and/or metal oxide hydrate comprises or is at least titanium ions, gives rise to a spacer layer and a layer 3 comprising a metal oxide, metal hydroxide and/or metal oxide hydrate, where the metal ion of the metal oxide, metal hydroxide and/or metal oxide hydrate comprises or is titanium ions and/or tin ions.

If the metal effect pigments of the invention, in addition to the at least two or three sequentially applied, preferably deposited, metal oxides, metal hydroxides and/or metal oxide hydrates, include further layers comprising metal oxides, metal hydroxides and/or metal oxide hydrates, it is also possible for further spacer layers to form within the further layers, provided that the process steps described above for the at least two or three sequentially applied, preferably deposited, metal oxides, metal hydroxides and/or metal oxide hydrates are observed.

The metal effect pigments of the invention may optionally be provided with at least one outer protective layer that further increases gassing stability and/or chemical stability.

The optionally present protective layer comprises polymers such as acrylates, epoxides, metal oxides, metal hydroxides and/or metal oxide hydrates, where the metal ion comprises or is at least one metal ion from the group of metals consisting of Si, Ce, Cr, Al, Sn, Zr, Zn and mixtures thereof, preferably selected from the group of metals Si, Ce, Al, Sn, Zr and mixtures thereof. In this context, the proportion of the optionally present protective layer is preferably within a range from 0.1% by weight to 7.0% by weight, more preferably within a range from 0.2% by weight to 5.2% by weight and most preferably within a range from 0.3% by weight to 3.1% by weight, based in each case on the total weight of the metal effect pigment of the invention.

The optionally present protective layer may additionally have been surface modified, for example by silanes. The silanes may have no functional bonding group or one or more functional bonding group(s). Silanes having at least one functional bonding group are also referred to hereinafter as organofunctional silanes.

For example, one or more silanes may have been applied to this outer protective layer. The silanes may be alkylsilanes having branched or unbranched alkyl radicals having 1 to 24 carbon atoms, preferably 6 to 18 carbon atoms.

In a further preferred embodiment, the silane without a functional bonding group is an alkylsilane. The alkylsilane preferably has the formula $R_{(4-z)}Si(X)_z$. In this formula, z is an integer from 1 to 3, R is a substituted or unsubstituted, unbranched or branched alkyl chain having 10 to 22 carbon atoms, and X is a halogen and/or alkoxy group. Preference is given to alkylsilanes having alkyl chains having at least 12 carbon atoms. R may also be bonded to Si in a cyclic manner, in which case z is typically 2.

In a further embodiment, it is also possible to use at least one organofunctional silane which enables a chemical bond to a plastic, or a binder of a lacquer or a paint, etc., for surface modification. The functional groups of the organofunctional silane may also be referred to as coupling groups or functional bonding groups and are preferably selected from the group consisting of hydroxyl, amino, acryloyl, methacryloyl, vinyl, epoxy, isocyanate, cyano and mixtures thereof.

The organofunctional silanes having suitable functional groups that are used with preference as surface modifiers are commercially available and are produced, for example, by Evonik and sold under the "Dynasylan" trade name. Further products can be purchased from Momentive (Silquest silanes) or from Wacker, for example standard silanes and α-silanes from the GENIOSIL product group.

Examples of these are 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), 3-mercaptopropyltrimethoxysilane (Dynasylan MTMO; Silquest A-189), 3-glycidoxypropyltrimethoxysilane (Dynasylan GLYMO, Silquest A-187), tris[3-(trimethoxysilyl)propyl]isocyanurate (Silquest Y-11597), bis[3-(triethoxysilyl)propyl)]tetrasulfide (Silquest A-1289), bis[3-(triethoxysilyl)propyl disulfide (Silquest A-1589), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)ethyldimethoxysilane (GENIOSIL XL 32, XL 34), (isocyanatomethyl)methyldimethoxysilane, (isocyanatomethyl)trimethoxysilane, 3-(triethoxysilyl)propylsuccinic anhydride (GENIOSIL GF 20), (methacryloyloxymethyl)methyldiethoxysilane, 2-acryloyloxyethylmethyldimethoxysilane, 2-methacryloyloxyethyltrimethoxysilane, 3-acryloyloxypropylmethyldimethoxysilane, 2-acryloyloxyethyltrimethoxysilane, 2-methacryloyloxyethyltriethoxysilane, 3-acryloyloxypropyltrimethoxysilane, 3-acryloyloxypropyltripropoxysilane, 3-methacryloyloxypropyltriethoxysilane, 3-methacryloyloxypropyltriacetoxysilane, 3-methacryloyloxypropylmethyldimethoxysilane, vinyltrichlorosilane, vinyltrimethoxysilane (GENIOSIL XL 10), vinyltris(2-methoxyethoxy)silane (GENIOSIL GF 58), vinyltriacetoxysilane or mixtures thereof. Preference is given to using, as organofunctional silanes, 3-methacryloyloxypropyltrimethoxysilane (Dynasylan MEMO, Silquest A-174NT), vinyltri(m)ethoxysilane (Dynasylan VTMO and VTEO, Silquest A-151 and A-171), methyltri(m)ethoxysilane (Dynasylan MTMS and MTES), beta-(3,4-epoxycyclohexyl)ethyltrimethoxysilane (Silquest A-186), bis(triethoxysilyl)ethane (Silquest Y-9805), gamma-isocyanatopropyltrimethoxysilane (Silquest A-Link 35, GENIOSIL GF40), methacryloyloxymethyltri(m)ethoxysilane (GENIOSIL XL 33, XL 36), (methacryloyloxymethyl)(m)ethyldimethoxysilane (GENIOSIL XL 32, XL 34), 3-(triethoxysilyl)propylsuccinic anhydride (GENIOSIL GF 20), vinyltrimethoxysilane (GENIOSIL XL 10) and/or vinyltris(2-methoxyethoxy)silane (GENIOSIL GF 58).

It is also possible to apply other organofunctional silanes to the particles of the invention or the pigments of the invention.

In addition, it is possible to use aqueous prehydrolyzates commercially available, for example, from Degussa. These include aqueous aminosiloxane (Dynasylan Hydrosil 1151), aqueous amino-/alkyl-functional siloxane (Dynasylan Hydrosil 2627 or 2909), aqueous diamino-functional siloxane (Dynasylan Hydrosil 2776), aqueous epoxy-functional siloxane (Dynasylan Hydrosil 2926), amino-/alkyl-functional oligosiloxane (Dynasylan 1146), vinyl-/alkyl-functional oligosiloxane (Dynasylan 6598), oligomeric vinylsilane (Dynasylan 6490) or oligomeric short-chain alkyl-functional silane (Dynasylan 9896).

In a preferred embodiment, the organofunctional silane mixture, as well as at least one silane without a functional bonding group, comprises at least one amino-functional silane. The amino function is a functional group which can enter into one or more chemical interactions with most of the groups present in binders. This may include a covalent bond, for example with isocyanate or carboxylate functions of the binder, or hydrogen bonds such as with OH or COOR functions, or else ionic interactions. An amino function is therefore of very good suitability for the purpose of chemical attachment of the pigment to various kinds of binder.

Preference is given to taking the following compounds for this purpose: 3-aminopropyltrimethoxysilane (Dynasylan AMMO; Silquest A-1110), 3-aminopropyltriethoxysilane (Dynasylan AMEO), [3-(2-aminoethyl)aminopropyl]trimethoxysilane (Dynasylan DAMO, Silquest A-1120), [3-(2-aminoethyl)aminopropyl]triethoxysilane, triamino-functional trimethoxysilane (Silquest A-1130), bis(gamma-trimethoxysilylpropyl)amine (Silquest A-1170), N-ethyl-gamma-aminoisobutyltrimethoxysilane (Silquest A-Link 15), N-phenyl-gamma-aminopropyltrimethoxysilane (Silquest Y-9669), 4-amino-3,3-dimethylbutyltrimethoxysilane (Silquest A-1637), ((cyclohexylamino)methyl)(diethoxy)methylsilane (GENIOSIL XL 924), N-cyclohexylaminomethyltriethoxysilane (GENIOSIL XL 926), N-(phenylaminomethyl)trimethoxysilane (GENIOSIL XL 973) or mixtures thereof.

In addition, the metal effect pigments of the invention may have been provided with a surface modification which, for example, facilitates the incorporation of the metal effect pigments into different media. In the case of use of the metal effect pigments of the invention in powder coatings, for example, the metal effect pigments preferably have one of the surface modifications disclosed in the main claims of EP 2 318 463 A1 or of EP 2 576 702 A1. Alternatively, the metal effect pigments of the invention may also have an outermost coating according to EP 1 699 884 A2, claim 1, which is preferably applied by the spray drying method according to EP 1 699 884 A2, claim 35. In the case of use of the metal effect pigments of the invention in cosmetic formulations, for example the incorporation thereof into O/W, W/O or W/Si emulsion systems can be facilitated by hydrophobic surface coverage, for example with Triethoxy Caprylylsilane (INCI), or more prolonged emulsion stability can be achieved.

The metal effect pigments of the invention can also be used in mixtures with transparent and/or hiding (in)organic white, chromatic or black pigments and/or metal effect pigments and/or pearlescent pigments and/or fillers in the application desired in each case. The amount in which the metal effect pigments of the invention are used depends on the particular application and on the optical effect to be achieved.

The metal effect pigments of the invention can be used in cosmetic formulations, plastics, films, textiles, ceramic materials, glasses, paints, printing inks, writing inks, lacquers and/or powder coatings. In addition, the metal effect pigments of the invention can also be used for functional applications, for example laser marking, greenhouse films or agricultural films.

In cosmetic formulations, for example body powder, face powder, pressed or loose powder, powder cream, eye makeup such as eyeshadow, mascara, eyeliner, liquid eyeliner, eyebrow pencil, lip balm, lipstick, lip gloss, lip liner, hair styling compositions such as hair spray, hair mousse, hair gel, hair wax, hair mascara, permanent or semipermanent hair dyes, temporary hair dyes, skincare compositions such as lotions, gels, emulsions, nail varnish compositions, it is possible to combine the metal effect pigments of the invention with raw materials, auxiliaries and active ingredients suitable for the particular application. The total concentration of metal effect pigments of the invention in the cosmetic formulation may be between 0.001% by weight for rinse-off products and 40.0% by weight for leave-on products, based in each case on the total weight of the formulation.

In a further embodiment, the metal effect pigments of the invention may be in compact particulate form. Compact particulate form is understood to mean pellets in the form of preferably cylinders and/or beads. The cylinders here preferably have a diameter from a range from 0.2 cm to 4.2 cm, more preferably from a range from 0.5 cm to 2.3 cm and most preferably from a range from 0.7 cm to 1.7 cm, and preferably a length from a range from 0.2 cm to 7.1 cm, more preferably from a range from 0.6 cm to 5.3 cm and most preferably from a range from 0.8 cm to 3.7 cm. The beads preferably have a radius of ≤1 cm, more preferably from a range from 0.2 cm to 0.7 cm and most preferably from a range from 0.3 cm to 0.5 cm.

In a preferred embodiment, the present invention relates to a metal effect pigment comprising a metallic substrate in platelet form, preferably an aluminum platelet, and a coating applied thereto, wherein the coating comprises a) optionally a layer 1 comprising metal oxides, metal hydroxides and/or metal oxide hydrates, where the metal ion comprises or is at least one metal ion from the group consisting of Al, Si, Sn, Mo and Zn, b) a layer 2 comprising at least one metal oxide, metal hydroxide and/or metal oxide hydrate, where the metal ion comprises or is at least one metal ion from the group of metals consisting of Ti, Sn and Fe, c) a layer 3 comprising at least one metal oxide, metal hydroxide and/or metal oxide hydrate, where the metal ion comprises or is at least one metal ion from the group of metals consisting of Ti, Sn, Zr and Fe, where at least one of layers 2 and 3 comprises at least two physically different metal ions from the above-listed groups, layers 2 and 3 are interrupted by at least one spacer layer of mean height $h_a$ from a range from 19 nm to 66 nm, and where the network density is within a range from 1% to 85% within the at least one spacer layer.

In a further embodiment, the present invention relates to a metal effect pigment comprising a metallic substrate in platelet form, preferably an aluminum platelet, and a coating applied thereto, wherein the coating comprises a) optionally a layer 1 comprising or consisting of silicon oxide, silicon hydroxide and/or silicon oxide hydrate,
b) a layer 2 comprising at least one metal oxide, metal hydroxide and/or metal oxide hydrate, where the metal ion comprises or is at least one noncoloring metal ion from the group of metals consisting of Ti, Sn and Fe,
c) a layer 3 comprising at least one metal oxide, metal hydroxide and/or metal oxide hydrate, where the metal ion comprises or is at least one noncoloring metal ion from the group of metals consisting of Ti, Sn and Fe, and at least one of layers 2 and 3 comprises at least two physically different metal ions from the above-listed groups, layers 2 and 3 are interrupted by a spacer layer, and where the metal effect pigments have an aspect ratio from a range from 1 to 1500, preferably from a range from 2 to 1200, more preferably from a range from 3 to 800 and most preferably from a range from 20 to 500.

In a further embodiment, the present invention relates to a metal effect pigment comprising a metallic substrate in platelet form, preferably an aluminum and/or iron platelet, and a coating applied thereto, wherein the coating comprises a) optionally a layer 1 comprising metal oxides, metal hydroxides and/or metal oxide hydrates, where the metal ion comprises or is at least one metal ion from the group of metals consisting of Si and Al,
b) a layer 2 comprising at least one metal oxide, metal hydroxide and/or metal oxide hydrate, where the metal ions comprise or are at least two metal ions from the group of metals consisting of Ti, Fe and Sn,
c) a layer 3 comprising at least one metal oxide, metal hydroxide and/or metal oxide hydrate, where the metal ions comprise or are at least two metal ions from the group of metals consisting of Ti, Fe and Sn, and layers 2 and 3 are interrupted by a spacer layer, where the coating comprises further layers of high and/or low refractive index and the metal effect pigment comprises at least one further spacer layer which runs essentially parallel to the surface of the metallic substrate in platelet form and is of mean height $h_a$ from a range from 11 nm to 87 nm, preferably from a range from 17 nm to 47 nm.

In a further embodiment, the present invention relates to a metal effect pigment comprising a metallic substrate in platelet form, preferably an aluminum platelet and/or gold bronze platelet, and a coating applied thereto, where the coating has through at least one spacer layer essentially parallel to the surface of the metallic substrate in platelet form and the metal effect pigment is obtainable by i) optionally applying an uncalcined silicon oxide, silicon hydroxide and/or silicon oxide hydrate layer, ii) sequentially applying three uncalcined metal oxides, metal hydroxides and/or metal oxide hydrates, where the second of these three uncalcined metal oxides, metal hydroxides and/or metal oxide hydrates is physically different from the others and is of such a nature that it can diffuse into at least one of the other uncalcined metal oxides, metal hydroxides and/or metal oxide hydrates, and iii) calcining the product obtained in step ii) at a temperature from a range from 320° C. to 970° C.

In one embodiment, the coating of the metal effect pigments of the invention, rather than the at least one metal oxide, metal hydroxide and/or metal oxide hydrate, comprises the corresponding metal suboxides, metal fluorides, metal nitrides, metal oxynitrides, metal oxyhalides and/or metal sulfides.

In one embodiment, the coating of the metal effect pigments of the invention comprises, in addition to the at least one metal oxide, metal hydroxide and/or metal oxide hydrate, at least one metal suboxide, metal fluoride, metal nitride, metal oxynitride, metal oxyhalide and/or metal sulfide.

There follows an elucidation in detail of the invention by a few examples, but the examples do not restrict the invention. All % specifications in the examples and comparative examples should be understood as % by weight.

I Production of the Metal Effect Pigments of the Invention

EXAMPLE 1

A reaction vessel was initially charged with 215 g of aluminum paste (STAPA METALLUX Mex 214, NFA: 69.1%, from ECKART GmbH) together with 650 g of ethanol and dispersed for 10 minutes. Subsequently, 20.0 g of DM water (DM=demineralized) were added to the suspension and the mixture was heated to 75° C. Once the pH had been adjusted to pH 5.0 with acetic acid, 200 mL of a mixture of titanium(IV) isopropoxide and isopropyl alcohol in a volume ratio of 1:1 were dosed in gradually. On completion of addition, 10 g of demineralized water were added to the suspension and the mixture was stirred for a further 30 minutes. Subsequently, 30 mL of an ethanolic $FeCl_3$ solution ($w(FeCl_3)$=40.0%) were dosed in at constant pH. In the course of this, any rise in pH was counteracted with ethanolic NaOH w(NaOH)=10%. After the addition had ended, the mixture was left to stir for a further 30 minutes, then another 200 mL of a mixture of titanium(IV) isopropoxide and isopropyl alcohol were dosed in homogeneously in a volume ratio of 1:1. After all the additions had ended, the suspension was left to stir for a further 60 minutes, before being filtered with suction through a Büchner funnel while still hot and washed through with a mixture of ethanol and demineralized water in a volume ratio of 1:1. Lastly, the filtercake was washed with pure ethanol to free it of $H_2O$ and dried at 100° C. in a drying cabinet under an $N_2$ atmosphere for 17 hours. The dried metal effect pigment was calcined at 500° C. under protective gas for 60 minutes.

EXAMPLE 2

A reaction vessel was initially charged with 230 g of aluminum paste (ALOXAL PM 4010, NFA:65.9%, from ECKART GmbH) together with 630 g of ethanol and dispersed for 10 minutes. Subsequently, 20.0 g of demineralized water were added to the suspension and the mixture was heated to 75° C. Once the pH had been adjusted to pH 5.0 with acetic acid, 200 mL of a mixture of titanium(IV) isopropoxide and isopropyl alcohol in a volume ratio of 1:1 were metered in gradually. On completion of addition, 10 g of demineralized water were added to the suspension and the mixture was stirred for a further 30 minutes. Subsequently, 150 mL of an ethanolic $FeCl_3$ solution ($w(FeCl_3)$=40.0%) were dosed in at constant pH. In the course of this, any rise in pH was counteracted with ethanolic NaOH w(NaOH)

=10%. After the addition had ended, the mixture was left to stir for a further 30 minutes, then another 200 mL of a mixture of titanium(IV) isopropoxide and isopropyl alcohol were dosed in homogeneously in a volume ratio of 1:1. After all the additions had ended, the suspension was left to stir for a further 60 minutes, before being filtered with suction through a Büchner funnel while still hot and washed through with a mixture of ethanol and demineralized water in a volume ratio of 1:1. Lastly, the filtercake was washed with pure ethanol to free it of $H_2O$ and dried at 100° C. in a drying cabinet under an $N_2$ atmosphere for 17 hours. The dried metal effect pigment was calcined at 550° C. under protective gas for 60 minutes.

EXAMPLE 3

Example 3 was conducted analogously to example 2, except that the starting material used, rather than ALOXAL PM 4010, was the $SiO_2$-encapsulated aluminum effect pigment STANDART PCS 3500 (from ECKART GmbH).

EXAMPLE 4

200 g of STANDART PCS 3500 $SiO_2$-encapsulated aluminum pigment from Eckart were suspended in 1300 mL of demineralized water and heated to 85° C. while stirring. The pH of the suspension was lowered to pH 2.2. By addition of 100 g of a tin chloride solution of concentration c(Sn)=12 g/L, a layer of "$SnO_2$" was deposited on the surface of the aluminum platelets.

After the mixture had been stirred for a further 20 minutes, a solution of 250 mL of $TiCl_4$ (200 g of $TiO_2$/L of demineralized water) was added to the suspension. After the end of the addition, the mixture was stirred for a further 10 minutes and then the pH was adjusted to pH 2.6. Subsequently, 60 mL of an aqueous iron chloride solution having a density of 1.42 g/cm³ were dosed in. On completion of metered addition, the mixture was stirred for another 10 minutes and, by addition of 100 mL of tin chloride solution of concentration c(Sn)=12 g/L, a further thin layer of tin oxide was deposited on the pigment surface. Subsequently, 250 mL of a solution of $TiCl_4$ (200 g of $TiO_2$/L of demineralized water) were dosed into the suspension. Thereafter, 12 mL of an aqueous iron chloride solution having a density of 1.42 g/cm³ were dosed in after 10 minutes. 15 minutes after completion of addition, the suspension was filtered off and the filtercake was washed. The filtercake was dried and calcined at 550° C. for 60 minutes under protective gas. Hiding, extremely chromatic, high-gloss golden metal effect pigments were obtained.

II Characterization of the Metal Effect Pigments of the Invention and Pigments from the Comparative Examples IIa Particle Size Measurement The size distribution curve of the metal effect pigments of the invention and pigments from the comparative examples was determined with an instrument from Quantachrome (instrument: Cilas 1064) according to the manufacturer's instructions. For this purpose, about 50 mL of the respective pigment were suspended in isopropanol, treated in an ultrasound bath (instrument: Sonorex IK 52, from Bandelin) for 300 seconds and then applied by means of a Pasteur pipette to the sample preparation cell of the measuring instrument and analyzed repeatedly. The individual measurement results were used to form the medians. The scattered light signals are evaluated by the Fraunhofer method.

The median particle size $D_{50}$ in the context of this invention is understood to mean the $D_{50}$ of the cumulative frequency distribution of the volume-averaged size distribution function, as obtained by laser diffraction methods. The $D_{50}$ indicates that 50% of the pigments have a diameter equal to or less than the value reported, for example 20 μm. Correspondingly, the $D_{90}$ states that 90% of the pigments have a diameter equal to or less than the respective measured value. In addition, the $D_{10}$ states that 10% of the pigments have a diameter equal to or less than the respective measured value.

IIb Aspect Ratio

The aspect ratio is defined as the ratio of median particle size $D_{50}$ to mean thickness h of the metallic substrates in platelet form. The mean thickness of the metallic substrates in platelet form is reported in table 6.

TABLE 1

Particle sizes and aspect ratio

| Example/comparative example | $D_{10}$ [μm] | $D_{50}$ [μm] | $D_{90}$ [μm] | Span | Aspect ratio |
|---|---|---|---|---|---|
| Example 1 | 10.2 | 35.6 | 55.6 | 1.274 | 41 |
| Example 2 | 2.2 | 34.0 | 56.8 | 1.604 | 56 |
| Example 3 | 5.0 | 31.4 | 50.9 | 1.461 | 38 |
| Example 4 | 4.8 | 30.6 | 51.2 | 1.516 | 36 |
| Comparative example 1 | 12.0 | 26.0 | 43.0 | 1.192 | 47 |

IIc Angle-dependent Color Measurements and Hiding Quotient

To measure the color and brightness values, the metal effect pigments of the invention and the pigments from the comparative examples were stirred into a conventional nitrocellulose lacquer (Erco 2615e bronze mixing lacquer colorless; from Maeder Plastiklack AG) at a pigmentation level of 6% by weight, based in each case on the total weight of the wet lacquer. This was done by initially charging the respective pigments and then dispersing them into the lacquer with a brush. The finished lacquer was applied to black/white hiding charts (Byko-Chart 2853, from Byk-Gardner) in a wet film thickness of 76 μm with a spiral applicator on an applicator drawdown apparatus (RK Print Coat Instr. Ltd. Citenco K 101 drawdown apparatus), and subsequently dried at room temperature.

The BYK-mac multi-angle colorimeter (from Byk-Gardner) was used to determine the color values on the black background of the hiding chart at a constant angle of incidence of 45° (according to the manufacturer's instructions) at various observation angles relative to the specular angle.

Characterization of the color intensity was accomplished using the chroma value $C^*_{15}$, which was measured at a measurement angle separated by 15° from the specular angle on the black background of the black/white hiding chart.

Strongly reflecting samples (mirrors in the ideal case) reflect virtually all the incident light at what is called the specular angle. The closer to the specular angle the measurement is made on the lacquer application, the more intense the appearance of the interference color.

To determine the hiding quotient $D_q$, defined as $D_q = L^{*25}_{white} / L^{*25}_{black}$, the brightness values $L^*25°$ of the above-described lacquer applications were recorded with the BYK-mac multi-angle colorimeter (from Byk-Gardner) at a measurement angle of 25° on the black and white backgrounds of the black/white hiding chart. The 25° measurement geometry, at a constant angle of incidence of 45°, relates to the difference from the specular angle. The viewing angle is measured away from the specular reflection in the plane of illumination.

TABLE 2

Color values at observation angle of 15° relative to the specular angle

| Example/comparative example | L 15° (s)[1] | a* 15° (s) | b* 15° (s) |
|---|---|---|---|
| Example 1 | 118.93 | −0.02 | 2.58 |
| Example 2 | 110.69 | 19.76 | 82.32 |
| Example 3 | 116.90 | −0.22 | 3.59 |
| Example 4 | 145.70 | −2.34 | 60.59 |
| Comparative example 1 | 127.93 | 22.86 | 73.45 |

[1]Measured on the black background of the black/white hiding chart.

IId Gloss Measurements

Gloss is a measure of directed reflection. To determine the gloss, the lacquer applications from IIc on the white background of the black/white hiding chart were analyzed at a measurement angle of 60° based on the vertical with the aid of a Micro-Tri-Gloss gloss meter from Byk-Gardner. The gloss values of the metal effect pigments of the invention and of the pigments from the comparative examples are listed in table 3.

Some of the inventive metal effect pigments from examples 1 to 4 show distinctly higher gloss values than the pigments having a single-layer coating from comparative example 1.

The gloss measurements from table 3 confirm the very high reflectivity of the pigments of the invention compared to the prior art.

IIe Effect Measurements

In order to objectively describe the optical effect of the metal effect pigments of the invention, effect measurements were conducted with the BYK-mac spectrophotometer (from Byk-Gardner) using the lacquer applications from IIc (cf. Byk-Gardner, catalog "Qualitätskontrolle für Lacke and Kunststoffe" [Quality Control for Lacquers and Plastics], 2011/2012, p. 97/98). The corresponding measurement values for the sparkle intensity S_i, the sparkle area S_a and the graininess G are collated in table 3.

TABLE 3

Effect measurements, hiding quotient and gloss

| Example/comparative example | S_i 15° (s)[1] | S_a 15° (s)[1] | G (s)[1] | $D_q$ 25° | 60° gloss (w)[2] |
|---|---|---|---|---|---|
| Example 1 | 18.94 | 32.47 | 12.03 | 0.931 | 24.9 |
| Example 2 | 21.56 | 34.30 | 8.53 | 0.928 | 30.2 |
| Example 3 | 14.70 | 29.11 | 10.64 | 0.926 | 29.6 |
| Example 4 | 9.28 | 27.22 | 9.69 | 0.904 | 28.9 |
| Comparative example 1 | 2.99 | 4.32 | 2.89 | 0.999 | 25.6 |

[1]Measured on the black background of the black/white hiding chart.
[2]Measured on the white background of the black/white hiding chart.

The effect values S_i, S_a and G of the inventive metal effect pigments from examples 1 to 4 are higher than the values for comparative example 1. The achievable optical effects of the inventive metal effect pigments are much more marked than in the case of conventional effect pigments with a single-layer coating from comparative example 1.

IIe Waring Blender

In industry, many lacquers are processed in circulation systems. In this case, the lacquer components are subjected to high shear forces. The Waring blender test simulates these conditions and serves for assessment of the ring line stability/shear stability. Specifically pigments wherein the coating has not been adequately anchored on the support material exhibit significant deviations in the chroma values in this test compared to the untreated applications. The Waring blender test can thus be regarded as a measure of the mutual adhesion of the pigment coating with respect to shear forces.

For this purpose, the metal effect pigments of the invention or the pigments from the comparative examples were weighed out according to the recipe below and converted stepwise to a paste with a conventional acrylic lacquer in an 880 mL beaker. Thereafter, the viscosity was adjusted with butyl acetate/xylene 1:1 to 17" in the DIN 4 mm cup. A total of 600 g of lacquer were produced, of which 400 g were introduced into a jacketed water-cooled 1 kg vessel and stirred with a specific attachment under the Dispermat (from Waring Blenders). The stirring time was 8 minutes at 13 500 rpm, then 200 g of lacquer were removed and the rest was stirred for a further 12 minutes.

Recipe: 6% pigment
  8% butyl acetate 85
  86% acrylic lacquer, colorless
  30% dilution butyl acetate 85/xylene 1:1

200 g each of the untreated and treated lacquers were applied to a test sheet with a spraying machine and the Sata LP-90 spray gun according to the following setting:

Setting: Needle: 1.3.4
  Pressure: 4 bar

Runs: The number of spray runs was chosen such that there was a dry lacquer layer thickness of 15-20 µm.

Conventionally, effect pigments are regarded as being shear-stable when the gloss differential and the color differential, measured close to the specular angle, are relatively low in the application after the Waring blender test. The $\Delta C^*_{15}$ value relative to the untreated sample should ideally be less than 2.

Table 4 shows the change in color $\Delta C^*_{15}$ and the change in gloss $\Delta 60°$ gloss of the sample that has been subjected to the Waring blender test relative to the untreated sample for inventive examples 2 and 4.

TABLE 4

Gloss differential and color differential in the Waring blender test

| | ΔC* (15°) | Δgloss (60°) |
|---|---|---|
| Example 2 | 2.1 | −2.3 |
| Example 4 | 2.6 | −1.9 |

The metal effect pigments of the invention from examples 2 and 4 fulfill the criteria of the test. The color difference is negligibly small. Even under the microscope, it is barely possible to detect any changes such as flaking of the coating or other surface defects that have arisen.

The metal effect pigments of the invention are found to be extremely shear-stable in spite of their spacer layer.

IIg X-ray Fluorescence Analysis (XRF)

The metal oxide, metal hydroxide and/or metal oxide hydrate contents of the particles or pigments were determined by means of x-ray fluorescence analysis (XRF) from the powder bed. The measurements are shown in table 5. The figures for the different contents were reported here as $TiO_2$ for titanium, as $Fe_2O_3$ for iron, as $Al_2O_3$ for Al, and if appropriate as $ZrO_2$ for Zr, as $SiO_2$ for Si, as $Mo_2O_3$ for Mo and as $SnO_2$ for tin.

TABLE 5

| | XRF (as oxide) | | |
|---|---|---|---|
| Example | Ti [%] | Fe [%] | Al [%] |
| Example 1 | 25.2 | 3.7 | 70.8 |
| Example 2 | 33.3 | 4.4 | 60.2 |
| Example 3 | 31.9 | 4.4 | 59.8 |
| Example 4 | 28.6 | 14.6 | 55.4 |
| Comparative example 1 | <1 | 19 | 67.6 |

IIh Determination of the mean thickness of the metallic substrates in platelet form, the mean layer thickness of layers 1, 2 and 3, the mean layer thickness of the overall coating, the mean height $h_a$ of the spacer layer and the mean height $h_H$ of the cavities For this purpose, the metal effect pigments of the invention were incorporated in a concentration of 10% into a two-component clearcoat, Autoclear Plus HS from Sikkens GmbH, with a sleeved brush, applied to a film with the aid of a spiral applicator (wet film thickness 26 μm) and dried. After a drying time of 24 h, transverse sections of these applicator drawdowns were produced. The transverse sections were analyzed by SEM, with analysis of at least 100 individual pigments to be statistically meaningful for determination of the mean thickness of the metallic substrates in platelet form.

To determine the mean layer thickness of layers 1, 2 and 3, the mean layer thickness of the overall coating, the mean height ha of the spacer layer and the mean height $h_H$ of the cavities, the upper and lower substrate surfaces, i.e. the longer side in each case of the metallic substrate in platelet form, were each used as the baseline. The baseline was drawn here on the scanning electron micrograph of the transverse section by connecting the two points of intersection of metallic substrate in platelet form—optional layer 1 or of metallic substrate in platelet form—layer 2 from the left- and right-hand edges of the scanning electron micrograph of the transverse section to one another by means of a straight line. The scanning electron micrographs of transverse section were analyzed with the aid of the AxioVision 4.6.3 image processing software (from Zeiss).

A sufficient number of parallel lines were drawn at 50 nm intervals at a 90° angle from these two baselines as to place a grid over the complete scanning electron micrograph of the transverse section (FIG. 4). The magnification of the scanning electron micrograph of the transverse section was preferably at least 50 000-fold, based on Polaroid 545. Proceeding from the respective upper and lower baselines of the metallic substrate in platelet form in the direction of layer 3 in each case, the distances between the points of intersection of these lines at the respective interfaces of the optional layer 1-layer 2, layer 2-spacer layer, spacer layer-layer 3 and layer 3-environment were measured manually. It happened here that a line marked at 50 nm intervals was located directly above a connection point. In this case, only the respective point of intersection of the line at the interface of layer 3-environment was recorded. These measurements yielded the layer thicknesses of layers 1, 2 and 3, the thickness of the overall coating, and the height $h_a$ of the spacer layer by formation of differences.

For the determination of the mean height $h_H$ of the cavities, the points of intersection of these lines with the upper and lower cavity boundaries within the spacer layer were used.

For the determination of the thickness of the metallic substrate in platelet form, the points of intersection of these lines at the upper and lower substrate surface to the adjoining layer in each case were employed.

The individual values of the thickness of the substrate, the layer thicknesses, the height $h_a$ and the height $h_H$ that have been determined in this way were used to form the respective arithmetic means in order to determine the above-specified mean layer thicknesses, mean thicknesses of the metallic substrate in platelet form, the mean height $h_H$ and the mean height $h_a$. To be statistically meaningful, the above-described measurements were conducted on at least 100 lines.

The term "mean" in all cases means the arithmetic mean.

Transverse sections of the pigments from the comparative examples that do not have a spacer layer but may have statistically distributed pores within the coating were likewise examined by the method described above using scanning electron micrographs of transverse sections. In this case, if one of the parallel lines occurred above one or more pores, the height of the pore(s), the pore midpoint(s) thereof and the distance of the pore midpoint(s) from the substrate surface were determined.

As an alternative to transverse sections, the metal effect pigments of the invention can also be cut by means of the FIB method (FIB=focused ion beam). For this purpose, a fine beam of highly accelerated ions (for example gallium, xenon, neon or helium) is focused to a point by means of ion optics and guided line by line over the effect pigment surface to be processed. On impact with the effect pigment surface, the ions release most of their energy and destroy the coating at this point, which leads to removal of material line by line. It is also possible using the scanning electron micrographs that have then been recorded, by the method described above, to determine the mean height $h_a$, the mean layer thickness of layers 1, 2 and 3 and the mean layer thickness of the overall coating. The mean thickness of the metallic substrate in platelet form can also be determined using scanning electron micrographs of the metal effect pigments that have been cut by the FIB method.

TABLE 6

| Example/comparative example | $d_{S1}$ [nm] | $d_{S2}$ [nm] | $h_a$ [nm] | $d_{S3}$ [nm] | $h_{ma}$ [nm] | $h_{Rma}$ | $\sigma h_{Rma}$ [%] | d [nm] | $n_S$ | $S_D$ [%] | $A_H$ [%] |
|---|---|---|---|---|---|---|---|---|---|---|---|
| Example 1 | / | 53 | 16 | 49 | 60 | 0.51 | 3.6 | 860 | 14 | 65.6 | 34.4 |
| Example 2 | 68 | 46 | 19 | 53 | 56 | 0.30 | 2.7 | 605 | 5 | 18.3 | 81.7 |
| Example 3 | 46 | 50 | 21 | 58 | 52 | 0.30 | 4.1 | 834 | 3 | 21.8 | 78.2 |
| Example 4 | 43 | 85 | 28 | 89 | 95 | 0.39 | 3.8 | 848 | 1 | 6.2 | 93.8 |

TABLE 6-continued

| Example/comparative example | $d_{S1}$ [nm] | $d_{S2}$ [nm] | $h_a$ [nm] | $d_{S3}$ [nm] | $h_{ma}$ [nm] | $h_{Rma}$ | $\sigma h_{Rma}$ [%] | d [nm] | $n_S$ | $S_D$ [%] | $A_H$ [%] |
|---|---|---|---|---|---|---|---|---|---|---|---|
| Comparative example 1 | | no spacer layer | | | | 0.53 | 22.3 | 556 | 17 | 95.0 | 5.0 | d [nm] = mean thickness of the substrate
$d_{S1}$ [nm] = mean layer thickness of optional layer 1
$d_{S2}$ [nm] = mean layer thickness of layer 2
$d_{S3}$ [nm] = mean layer thickness of layer 3
$n_S$ = mean number of bars per μm
$A_H$ [%] = area proportion of cavities
$S_D$ = network density [%]
$h_{ma}$ = midpoint of the spacer layer (sum total of the layer thickness of the optional layer 1 and of layer 2 and half the height $h_a$)
$h_{Rma}$ = relative height of the spacer layer
$\sigma h_{Rma}$ [%] = standard deviation of the relative height of the spacer layer
$h_a$ = mean height of the spacer layer In table 6, the network density of the metal effect pigments of the invention is much lower than in the case of the pigment from comparative example 1 with a value of 95%. Because of the extremely small number of pores, there is no spacer layer in the pigment from comparative example 1.

IIi Gassing Test

For the determination of the gassing stability, 15 g of the metal effect pigments of the invention and the pigments from the comparative examples were suspended in 20.0 g of butylglycol with a stirring time of 5 min. To this suspension were added 14.4 g of colorless binder (ZK26-6826-402, manufacturer: BASF Coatings) and 0.6 g of 10% dimethylethanolamine solution (solvent: water), and the mixture was stirred for 5 minutes.

23.45 g of the suspension were stirred into a mixture of 233.1 g of milky/colorless mixed lacquer for effect substance testing (ZW42-6008-0101, manufacturer: BASF Coatings), 37.5 g of red waterborne basecoat tinting paste (ZU560-329-0001, manufacturer: BASF Coatings, containing iron oxide red, $Fe_2O_3$) and 6.0 g of black waterborne basecoat tinting paste (ZU42-5943-0001, manufacturer: BASF Coatings, containing iron oxide black, $Fe_2O_3.FeO$). Subsequently, the pH of the suspension was adjusted to 8.2 with 10% dimethylethanolamine solution (solvent: water).

265 g of the above composition were introduced into a gassing bottle which was sealed with a twin-chamber gas bubble counter. The gas wash bottle was equilibrated at 40° C. in a water bath for 1 hour and sealed gas-tight, and the test was conducted over a maximum of 28 days. The gas volume formed was read off from the displaced volume of water in the upper chamber of the gas bubble counter. In the case of evolution of not more than 10 mL of hydrogen after 28 days, the test was considered to have been passed. The results of the gassing test are compiled in table 6.

IIj Powder Coating Application 15 g in each case of the metal effect pigment of the invention or from the comparative example were mixed together with 285 g of the Tiger powder coating from Tiger Coatings GmbH & Co. KG and with 0.2% Aeroxide Alu C (from Evonik) in a commercial kitchen mixer from Vorwerk, ThermoMix, at level 4 for 4 minutes. The mixed powder coatings were applied to metal sheets with the OptiSelect (from ITWGema) in a commercial powder coating cabin.

The application characteristics, the presence of black spots and the structure and leveling of the powder coatings were assessed visually.

IIk Chemicals Test

The coated test sheet from IIj was put in a horizontal position. 5 drops of 10% HCl were applied with contact times of 180, 150, 120, 90 and 60 minutes. Also applied were 5 drops of 1 M NaOH with contact times of 180, 120, 60, 30 and 15 minutes.

Thereafter, the drops were removed with water and the formerly covered sites were visually compared with the uncovered sites. In this context, a rating scale of 0-3 (for each individual point) was applied (0=no attack, 3 maximum degradation of pigments). The points determined were then added up. The results of the chemicals test can be found in table 7.

TABLE 7

| Example | Gassing test [d/ml] | Chemicals test |
|---|---|---|
| Example 3 | 28 d/5 mL | 1 |
| Example 4 | 28 d/3 mL | 0 |
| Comparative example 1 | 5 d/failed | 3 |

The advantages of the metal effect pigments of the invention are apparent in the sum total of various properties. The metal effect pigments of the invention have high hiding, very good mechanical and chemical stability, and high gloss and color intensity. The comparative pigment, considered overall, has the properties mentioned only in an unsatisfactory manner.

III Scanning Electron Micrographs

The scanning electron micrographs were obtained using transverse sections of the metal effect pigments of the invention with the Supra 35 scanning electron microscope (from Zeiss). Energy-dispersive x-ray micro-analysis (EDX analysis) was conducted with the EDAX Sapphire instrument, from EDAX.

III Application Examples

APPLICATION EXAMPLE 1

Eyeshadow Cream

| INCI name | Product name | % by wt. | Manufacturer/supplier |
|---|---|---|---|
| Phase A | | | |
| Microcrystalline Wax | TeCero-Wax 1030 K | 4.50 | Tromm Wachs |
| *Copernicia Cerifera* Cera | Carnaubawachs LT 124 | 4.50 | Tromm Wachs |

-continued

| INCI name | Product name | % by wt. | Manufacturer/ supplier |
|---|---|---|---|
| Isohexadecane | Isohexadecane | 21.00 | Ineos |
| Cyclopentasiloxane, Dimethicone/ Vinyltrimethylsiloxysilicate Crosspolymer | Belsil RG 100 Silicone Elastomer Resin Gel | 8.00 | Wacker |
| Trimethylsiloxyphenyl Dimethicone | Belsil PDM 20 | 6.00 | Wacker |
| Dimethicone | Belsil DM 100 | 14.00 | Wacker |
| Caprylic/Capric Triglyceride | Miglyol 812 | 7.00 | Sasol |
| Cyclomethicone (and) Quaternium-90 Bentonite (and) Propylene Carbonate | Tixogel VSP-1438 | 5.00 | BYK |
| Phase B | | | |
| | Metal effect pigment from example 1 | 30.00 | |

The metal effect pigment from example 1 can be used within a range from 5% to 30.0% by weight, based on the total weight of the eyeshadow formulation. Compensation to 100% by weight of the formulation can be effected with isohexadecane.

Phase A was mixed and heated to 85° C., then phase B was added to phase A while stirring. After dispensing into an appropriate container, the mixture is cooled to room temperature.

APPLICATION EXAMPLE 2

Eyeshadow Compact

| INCI name | Product name | % by wt. | Manufacturer/ supplier |
|---|---|---|---|
| Phase A | | | |
| Talc | Talc Powder | 36.00 | VWR |
| Bentonite | Optigel CK-PC | 5.00 | BYK |
| Synthetic | Synafil S 1050 | 13.00 | ECKART |
| Aluminium Starch | Agenaflo OS 9051 | 10.00 | Agrana |
| Magnesium Stearate | Magnesium Stearate | 6.00 | VWR |
| | Metal effect pigment from example 2 | 20.00 | |
| Phase B | | | |
| Cyclomethicone | Xiameter PMX-0345 | 5.00 | Dow Corning |
| Octyldodecyl Stearoyl Stearate | Ceraphyl 847 | 5.00 | Ashland |

The metal effect pigment from example 2 can be used within a range from 5.0% to 40.0% by weight, based on the total weight of the eyeshadow formulation. Compensation to 100% by weight of the formulation can be effected with talc.

Phase A was mixed in a high-speed mixer at 2500 rpm for 30 s. Subsequently, phase B was added and the mixture was mixed in the same mixer at 3000 rpm for 60 s. Finally, the powder mixture was pressed into shape by means of an eyeshadow press at 100 bar for 30 seconds.

APPLICATION EXAMPLE 3

Body Powder

| INCI name | Product name | % by wt. | Manufacturer/ supplier |
|---|---|---|---|
| Phase A | | | |
| Synthetic Fluorphlogopite | Synafil S 1050 | 40.00 | ECKART |
| Polypropylene | Synafil W 1234 | 8.00 | ECKART |
| Bentonite | Optigel CK-PC | 10.00 | BYK |
| Talc | Talc Powder | 18.00 | VWR |
| Magnesium Stearate | Magnesium Stearate | 4.00 | Applichem |
| | Metal effect pigment from example 3 | 20.00 | |

The metal effect pigment from example 3 can be used within a range from 0.2% to 5.0% by weight, based on the total weight of the body powder formulation. Compensation to 100% by weight of the formulation can be effected with Synafil S 1050.

Phase A was mixed and then the powder was dispensed into a suitable vessel.

APPLICATION EXAMPLE 4

Lipgloss

| INCI name | Product name | % by wt. | Manufacturer/ supplier |
|---|---|---|---|
| Phase A | | | |
| Hydrogenated Polyisobutene (and) Ethylene/Propylene/ Styrene Copolymer (and) Butylene/Ethylene/Styrene Copolymer | Versagel ME 750 | 75.30 | Penreco |
| Simmondsia Chinensis (Jojoba) Seed Oil | Jojoba Oil - Natural | 2.00 | BioChemica |
| Caprylyl Trimethicone | Silcare Silicone 31M50 | 7.00 | Clariant |
| Stearyl Dimethicone | Silcare Silicone 41M65 | 3.20 | Clariant |
| Hydrogenated Polydecene | Dekanex 2004 FG | 4.00 | IMCD |
| Isopropyl Myristate | Isopropyl Myristate | 4.50 | VWR |
| Phase B | | | |
| | Metal effect pigment from example 1 | 4.00 | |

The metal effect pigment from example 1 can be used within a range from 0.10% to 8.00% by weight, based on the total weight of the lipgloss formulation. Compensation to 100% by weight of the formulation can be effected with Versagel ME 750.

Phase A was heated to 85° C., then the pigment from example 1 was added to phase B and stirred until the consistency was homogeneous, and then dispensed into a lipgloss vessel.

APPLICATION EXAMPLE 5

Lipstick

| INCI name | Product name | % by wt. | Manufacturer/ supplier |
|---|---|---|---|
| Phase A | | | |
| Octyldodecanol | Eutanol G | 42.5 | BASF |
| Candelilla Cera | Kahlwax 2039 | 6.00 | Kahl |
| *Copernicia Cerifera* (Carnauba) Wax | Kahlwax 2442 | 6.00 | Kahl |
| Bis-Diglyceryl Polyacyladipate-2 | Softisan 649 | 10.00 | Sasol |
| Polyisobutene | Rewopal PIB 1000 | 10.00 | Evonik |
| Hydrogenated Polydecene | Silkflo 364 NF | 5.00 | Ineos |
| C10-18 Triglycerides | Lipocire A Pellets | 5.00 | Gattefosse |
| *Acacia Decurrens*/Jojoba/ Sunflower Seed Wax/ Polyglyceryl-3 Esters | Hydracire S | 5.00 | Gattefosse |
| Tocopheryl Acetate | dl-alpha-Tocopheryl | 0.50 | IMCD |
| Phase B | | | |
| | Metal effect pigment from example 2 | 10.00 | |

The metal effect pigment from example 2 can be used within a range from 0.5% to 20.0% by weight, based on the total weight of the lipstick formulation. Compensation to 100% by weight of the formulation can be effected with Eutanol G.

Phase A was heated to 85° C., then phase B was added to phase A and mixed. Subsequently, this mixture was dispensed into a lipstick mold at a temperature of 75° C.

APPLICATION EXAMPLE 6

Liquid Eyelid Liner

| INCI name | Product name | % by wt. | Manufacturer/ supplier |
|---|---|---|---|
| Phase A | | | |
| Aqua | Water | 56.90 | |
| Bentonite (and) Xanthan Gum | Optigel WX-PC | 1.40 | |
| Phase B | | | |
| Lecithin | Emulmetik 100 | 0.10 | Lucas Meyer |
| *Copernicia Cerifera* Cera | Kahlwax 2442 | 1.00 | Kahl |
| Stearic Acid | Stearic Acid | 3.50 | Lipo Chemicals |
| Hydrogenated Polyisobutene | Panalane L14 E | 5.00 | Ineos |
| Polysorbate 60 | Mulsifan CPS 60 | 1.50 | Zschimmer & Schwarz |
| Phase C | | | |
| | Metal effect pigment from example 3 | 4.00 | |
| Polyurethane-35 | Baycusan C 1004 | 18.00 | Bayer Cosmetics |
| Aqua and Cl 77499 and Methylpropanediol and Ammonium Acrylates Copolymer and Simethicone and Caprylyl Glycol and Phenylpropanol Sodium Acrylates Copolymer | WorléeBase AQ 77499/1 | 8.00 | Worlée |
| Phenoxyethanol, Ethylhexylglycerin | Euxyl PE9010 | 0.60 | Schülke & Mayr |

The metal effect pigment from example 3 can be used within a range from 0.5% to 8.0% by weight, based on the total weight of the eyelid liner formulation. Compensation to 100% by weight of the formulation can be effected with water.

Optigel WX-PC was dispersed in water of phase A and stirred for 10 minutes. Phase A and phase B were heated separately to 80° C. Thereafter, phase B was added gradually to phase A while stirring. After cooling to 45° C., the ingredients of phase C were added gradually and the mixture was dispensed into a suitable package.

APPLICATION EXAMPLE 7

Mousse

| INCI name | Product name | % by wt. | Manufacturer/ supplier |
|---|---|---|---|
| Phase A | | | |
| Cyclopentasiloxane | Xiameter PMX-0245 Cyclosiloxane | 8.60 | Dow Corning |
| Hydrogenated Polyisobutene | MC 30 | 4.00 | Sophim |
| Dimethicone (and) Dimethicone Crosspolymer | Dow Corning 9041 Silicone Elastomer Blend | 37.14 | Dow Corning |
| Squalane | Squalane | 5.74 | Impag |
| Isononyl Isononanoate | Dermol 99 | 10.16 | Akzo International |
| Hydrogenated Jojoba Oil | Jojoba Butter LM | 2.15 | Desert Whale |
| Hydrogenated Jojoba Oi | Jojoba Butter HM | 1.00 | Desert Whale |
| C30-45 Alkyl Methicone (and) C30-45 Olefin | Dow Corning AMS-C30 Cosmetic Wax | 1.15 | Dow Corning |
| Stearyl Dimethicone | Dow Corning 2503 Cosmetic Wax | 0.47 | Dow Corning |
| Cyclopentasiloxane (and) Polypropylsilsesquioxane | Dow Corning 670 Fluid | 5.00 | Dow Corning |
| Phase B | | | |
| Dimethicone/Vinyl Dimethicone Crosspolymer | Dow Corning 9506 Powder | 16.02 | Dow Corning |
| Silica Dimethyl Silylate | Covasilic 15 | 0.17 | LCW |
| Talc | Talc Powder | 5.00 | Sigma-Aldrich |
| | Metal effect pigment from example 2 | 3.00 | |
| Phase D | | | |
| Phenoxyethanol, Ethylhexylglycerin | Euxyl PE 9010 | 0.40 | Schülke & Mayr |

The metal effect pigment from example 2 can be used within a range from 0.1% to 8.0% by weight, based on the total weight of the mousse formulation. Compensation to 100% by weight of the formulation can be effected with Dow Corning 9041 Elastomer.

Phase A was mixed and heated until everything had melted. Phase B was weighed out separately and mixed with a high-speed mixer at 2400 rpm for 60 s. Half of the molten phase A was added to phase B and the mixture was mixed again in the mixer at 2400 rpm for 30 s. Subsequently, the remaining portion of phase B was likewise added to phase A and the mixture was mixed again at 2400 rpm for 30 s. Lastly, phase C was added to phase AB and the mixture was mixed again in the high-speed mixer at 2400 rpm for 30 s.

FIG. 1: Detail of a scanning electron micrograph of a transverse section in 50 000-fold magnification (based on Polaroid 545) with a baseline drawn in at the interface of substrate in platelet form—coating, and lines arranged at right angles to the baseline. "x" marks the points of intersection at the interfaces.

Figure 2:
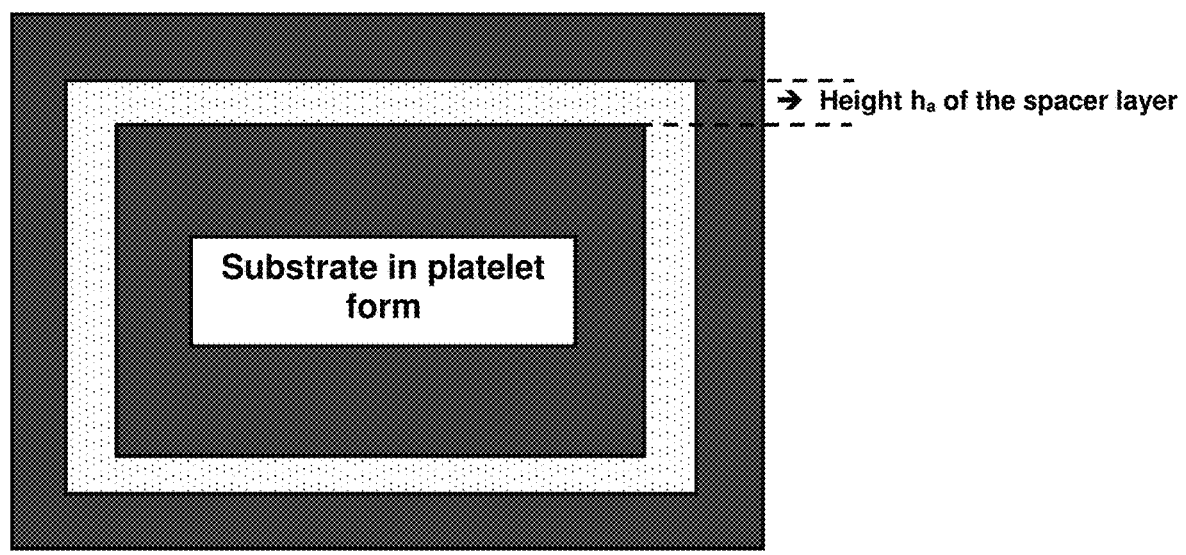
FIG. 2 is a schematic diagram of the spacer layer.

FIG. 2: Schematic diagram of the spacer layer.

FIG. 3: Schematic diagram of the position of the spacer layer.

The invention claimed is:

1. A metal effect pigment comprising a metallic platelet-shaped substrate and a coating applied to the substrate, wherein the coating comprises:
    a) optionally a layer 1 which comprises or consists of at least one of tin oxide, tin hydroxide or tin oxide hydrate,
    b) a layer 2 comprising at least one of metal oxide, metal hydroxide or metal oxide hydrate, and
    c) a layer 3 comprising at least one of metal oxide, metal hydroxide or metal oxide hydrate,
    and wherein at least one of layers 2 or 3 comprises at least two different metal ions and layers 2 and 3 are interrupted by a spacer layer,
    wherein the spacer layer has connections and cavities and wherein the spacer layer has a network density of <85%, wherein the network density is defined as the number of connections or spacers per number of lines in %, determined from a grid of parallel lines drawn at 50 nm intervals at a 90° angle from a baseline drawn onto each scanning electron micrograph of a traverse section along the surface of a longer side of the metallic substrate.

2. The metal effect pigment according to claim 1, wherein the network density of the spacer layer ranges from 1% to 75%.

3. The metal effect pigment according to claim 1, wherein the network density of the spacer layer ranges from 1% to 63%.

4. The metal effect pigment according to claim 1, wherein the network density of the spacer layer ranges from 1% to 49%.

5. The metal effect pigment as claimed in claim 1, wherein the at least two different metal ions of layer 2 and/or 3 are selected from the group of metals consisting of Ti, Fe, Sn, Mn, Zr, Ca, Sr, Ba, Ni, Sb, Ag, Zn, Cu, Ce, Cr, and Co.

6. The metal effect pigment as claimed in claim 1, wherein the metallic substrate selected from the group consisting of aluminum platelets, copper platelets, zinc platelets, iron platelets, titanium platelets, stainless steel platelets, silver platelets, alloys and mixtures of the above-listed metals.

7. The metal effect pigment as claimed in claim 1, wherein the effect pigment comprises further layers of high and low refractive index and optionally at least one further spacer layer.

8. The metal effect pigment as claimed in claim 1, wherein the at least one spacer layer has a mean height $h_a$ in each case from a range from 5 nm to 120 nm.

9. The metal effect pigment as claimed in claim 1, wherein the at least one spacer layer is arranged essentially parallel to the surface of the non-metallic substrate in platelet form.

10. The metal effect pigment as claimed in claim 1, wherein the space layer is distributed over the entire metal effect pigment, and has an area proportion of cavities from a range from 51% to 99% and an area proportion of connections from a range from 1% to 49%, measured using scanning electron of transverse sections.

11. An article comprising at least one metal effect pigment as claimed in claim 1.

12. The metal effect pigment according to claim 1, wherein the spacer layer has a standard deviation of the relative height of $\sigma h_{Rma}$ in a range of 0.2 to 18%, wherein the relative height $h_{Rma}$ is defined as the ratio of the height $h_{ma}$ to the layer thickness of the overall coating and $h_{ma}$ refers to the sum total of the layer thickness of optional layer 1, layer 2 and half the height ha of the spacer layer.

13. The metal effect pigment according to claim 12, wherein the mean height of the spacer layer is determined by the following method:
    the effect pigments are applied in a lacquer and cross sections are prepared and scanning electron micrographs analyzed thereof comprising the steps:
        establishing the upper and lower substrate surfaces as baselines which are the longer side of the nonmetallic substrate in platelet form in each case and drawing the baselines onto the scanning electron micrograph of the transverse section,
        analyzing the scanning electron micrographs of the transverse sections with the aid of the AxioVision 4.6.3 image processing software (from Zeiss),
        drawing a sufficient number of parallel lines at 50 nm intervals at a 90° angle with respect to the upper and lower baselines corresponding to the two surfaces of the substrate in platelet form establishing a grid over the effect pigment shown in the scanning electron micrograph of a transverse section (FIG. 4) using a magnification of at least 50 000-fold, based on Polaroid 545 (4"×5"),
        proceeding from the respective baseline of the metallic substrate in platelet form, in the direction of the respective layer 3 or the respective outermost layer, the points of intersection between the parallel lines arranged at right angles to the respective baseline with the respective interfaces of the optional layer 1 with layer 2, of layer 2 with the spacer layer, of the spacer layer with layer 3, and of layer 3 with the environment or with any further layer applied, is recorded;
        determining the thicknesses of layers 2 and 3, the layer thickness of the overall coating, the layer thickness of further layers optionally present, and the height $h_a$ of the spacer layer by formation of differences, wherein the layer thickness of layer 2 is calculated from the difference between the respective measured points of intersection at the respective interfaces of layer 2 with the spacer layer and of either optional layer 1 or the baseline with layer 2 if the nonmetallic substrate has not been covered with further layers beforehand, and the layer thickness of layer 3 is calculated from the difference between the respective measured points of intersection at the respective interfaces of layer 3 with the environment or with any further layer applied and of the spacer layer with layer 3 and the height $h_a$ is calculated from the difference between the respective measured points of intersection of spacer layer with layer 3 and layer 2 with the spacer layer,
    wherein the height $h_a$ is determined by forming the arithmetic mean by conducting this procedure to at least 100 of the parallel lines arranged at right angles to the baselines.

14. The metal effect pigment according to claim 12, wherein the standard deviation $\sigma h_{Rma}$ of the relative height is within a range from 0.3% to 15%.

* * * * *

UNITED STATES PATENT AND TRADEMARK OFFICE
CERTIFICATE OF CORRECTION

PATENT NO.        : 10,759,941 B2
APPLICATION NO.   : 15/536945
DATED             : September 1, 2020
INVENTOR(S)       : Michael Grüner et al.

Page 1 of 1

It is certified that error appears in the above-identified patent and that said Letters Patent is hereby corrected as shown below:

In the Claims

Column 35, Line 28, Claim 1, delete "traverse" and insert -- transverse --

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*